(12) United States Patent
Mastenbrook et al.

(10) Patent No.: US 12,101,418 B2
(45) Date of Patent: Sep. 24, 2024

(54) CRYPTOGRAPHIC KEYS FOR AUTHORIZATION REQUESTS FROM A DATA STORAGE DEVICE

(71) Applicant: Western Digital Technologies, Inc., San Jose, CA (US)

(72) Inventors: Brian Edward Mastenbrook, Fremont, CA (US); John So, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 268 days.

(21) Appl. No.: 17/689,809

(22) Filed: Mar. 8, 2022

(65) Prior Publication Data

US 2023/0291579 A1    Sep. 14, 2023

(51) Int. Cl.
*H04L 9/32* (2006.01)
*H04L 9/08* (2006.01)
*H04L 9/30* (2006.01)

(52) U.S. Cl.
CPC ............ *H04L 9/3271* (2013.01); *H04L 9/085* (2013.01); *H04L 9/0894* (2013.01); *H04L 9/3073* (2013.01)

(58) Field of Classification Search
CPC ..... H04L 9/3271; H04L 9/085; H04L 9/0894; H04L 9/3073
See application file for complete search history.

(56) References Cited

U.S. PATENT DOCUMENTS 9,286,493 B2   3/2016   Johnson et al.
9,813,416 B2   11/2017  Bolotin et al.
(Continued)

FOREIGN PATENT DOCUMENTS

WO   WO-2016063254 A1 *  4/2016   ......... G06F 21/6218
WO   WO-2019034951 A1 *  2/2019   ........... H04L 9/0637
(Continued)

OTHER PUBLICATIONS

Van Allen, Fox, "How to Unlock Your Computer Automatically With Your Phone" Retrieved online, URL: <https://www.techlicious.com/tip/computer-proximity-locks-for-mac-pc-chromebook/>, accessed on Oct. 24, 2019.
(Continued)

*Primary Examiner* — Sarah Su
(74) *Attorney, Agent, or Firm* — Patent Law Works LLP

(57) ABSTRACT

Disclosed herein is a data storage device. A data port transmits data between a host computer system and the data storage device. A non-volatile storage medium stores encrypted user content data and a cryptography engine connected between the data port and the storage medium uses a cryptographic key to decrypt the encrypted user content data. The access controller generates a challenge for a manager device. The challenge comprises a blinded public key of an ephemeral unlock key pair that is blinded by an unlock blinding key. The challenge further comprises the unlock blinding key in encrypted form. The access controller further provides the challenge to the device to be authorized for sending the challenge to the manager device; receives a response to the challenge; decrypts the unlock blinding key and calculates a shared secret; and upon determining that the response indicates approval of registering the device, registers the device to be authorized as an authorized device.

20 Claims, 9 Drawing Sheets

(56) References Cited

U.S. PATENT DOCUMENTS

| | | | |
|---|---|---|---|
| 10,083,130 B2 | 9/2018 | Bolotin et al. | |
| 10,146,706 B2 | 12/2018 | Bolotin et al. | |
| 10,154,020 B1 | 12/2018 | Bolotin et al. | |
| 10,166,950 B2* | 1/2019 | Katou | H04W 4/40 |
| 10,181,055 B2 | 1/2019 | Bolotin et al. | |
| 10,204,240 B2 | 2/2019 | Johnson et al. | |
| 10,313,874 B2 | 6/2019 | Amundsen et al. | |
| 11,088,832 B2 | 8/2021 | Mastenbrook | |
| 2010/0088527 A1 | 4/2010 | Johnson et al. | |
| 2010/0174913 A1 | 7/2010 | Johnson et al. | |
| 2013/0318351 A1* | 11/2013 | Hirano | H04L 9/3231 |
| | | | 713/168 |
| 2014/0150011 A1* | 5/2014 | Ohno | H04L 65/70 |
| | | | 725/31 |
| 2017/0169264 A1* | 6/2017 | Britt | G06Q 10/087 |
| 2018/0167208 A1* | 6/2018 | Le Saint | H04L 9/3265 |
| 2018/0307869 A1 | 10/2018 | Bolotin et al. | |
| 2018/0357406 A1 | 12/2018 | Bolotin et al. | |
| 2019/0007203 A1 | 1/2019 | Bolotin et al. | |
| 2019/0303603 A1 | 10/2019 | Courtney et al. | |
| 2021/0073359 A1* | 3/2021 | Boodaei | H04L 9/0844 |
| 2021/0173561 A1 | 6/2021 | Mastenbrook et al. | |
| 2021/0173944 A1* | 6/2021 | Mastenbrook | H04L 9/30 |
| 2021/0173953 A1 | 6/2021 | Mastenbrook et al. | |
| 2021/0216653 A1 | 7/2021 | Mastenbrook et al. | |
| 2021/0218555 A1* | 7/2021 | Mastenbrook | H04L 9/0866 |
| 2021/0218556 A1* | 7/2021 | Mastenbrook | H04L 9/3271 |
| 2021/0218557 A1* | 7/2021 | Mastenbrook | H04L 9/3242 |
| 2021/0218558 A1* | 7/2021 | Mastenbrook | H04L 9/3263 |
| 2021/0218566 A1 | 7/2021 | Mastenbrook et al. | |
| 2023/0188345 A1* | 6/2023 | Chang | H04L 9/50 |
| | | | 713/155 |
| 2023/0289089 A1* | 9/2023 | Mastenbrook | G06F 21/78 |
| 2023/0289456 A1* | 9/2023 | Mastenbrook | H04L 9/3271 |
| 2023/0291548 A1* | 9/2023 | Mastenbrook | H04L 9/3265 |

FOREIGN PATENT DOCUMENTS

| | | | | |
|---|---|---|---|---|
| WO | WO-2019191216 A1 * | 10/2019 | | G06F 21/31 |
| WO | WO-2019226115 A1 * | 11/2019 | | |
| WO | WO-2020072882 A1 * | 4/2020 | | G06F 21/32 |
| WO | WO-2021059057 A1 * | 4/2021 | | H04L 9/007 |
| WO | WO-2021181201 A1 * | 9/2021 | | A61B 1/00059 |
| WO | WO-2022018727 A1 * | 1/2022 | | H04L 9/0643 |

OTHER PUBLICATIONS

Athow, Desire, "SecureData SecureDrive BT 1TB review" Retrieved online, URL: <https://www.techradar.com/reviews/securedata-securedrive-bt-1tb>, accessed on Oct. 24, 2019.

Smith, Lyle, "SecureData SecureDrive BT External Drive Review" Retrieved online, URL: <https://storagereview.com/securedata_securedrive_bt_external_drive_review>, accessed on Oct. 24, 2019.

"DataLock BT Remote Management", Retrieved online, URL: <https://www.clevx.com/datalock-bluetooth-encryptedsecurity/>, accessed on Oct. 24, 2019.

* cited by examiner

CRYPTOGRAPHIC KEYS FOR AUTHORIZATION REQUESTS FROM A DATA STORAGE DEVICE

TECHNICAL FIELD

This disclosure relates to a data storage device that can be locked and unlocked.

BACKGROUND

Encryption of data enables relatively secure storage on data storage devices, such as block data storage devices connectable via a Universal Serial Bus (USB) cable. However, the user experience is often disappointing because the setup of passwords, keys and the like is cumbersome and complicated for technically unskilled users. If encryption is used, the keys and passwords are too often stored insecurely. As a result, many users leave existing encryption technology effectively unused resulting in exposed confidential data.

SUMMARY

This disclosure relates to a data storage device, such as, but not limited to, a block data storage device connectable to a host computer system via a USB cable, so that the data storage device registers as a mass data storage device with the operating system of the host computer system. The data storage device is locked so that the host computer system cannot access data stored on the data storage device. However, a user can unlock the data storage device by using an authorized device that is set up to unlock the data storage device.

A data storage device comprises:
a data path comprising:
  a data port configured to transmit data between a host computer system and the data storage device;
  a non-volatile storage medium configured to store encrypted user content data; and
  a cryptography engine connected between the data port and the storage medium, wherein
  the cryptography engine is configured to use a cryptographic key to decrypt the encrypted user content data stored on the storage medium in response to a request from the host computer system; and
an access controller configured to, upon a device to be authorized requesting to be registered as an authorized device:
generate a challenge for a manager device, the challenge comprising a blinded public key of an ephemeral unlock key pair that is blinded by an unlock blinding key, the challenge further comprising the unlock blinding key in encrypted form, wherein the unlock blinding key is discarded from the data storage device after generating the challenge; wherein
  the host computer system is a first device;
  the manager device is a second device; and
  the device to be authorized is a third device;
provide the challenge to the device to be authorized for sending the challenge to the manager device;
receive a response to the challenge generated by the manager device, the response comprising the blinded public key multiplied by a private key stored on the manager device, the response further comprising the unlock blinding key in encrypted form;
decrypt the unlock blinding key and using the decrypted unlock blinding key to unblind the blinded public key multiplied by a private key stored on the manager device to thereby calculate a shared secret;
upon determining that the response indicates approval of registering the device to be authorized, using the shared secret to store configuration data on the non-volatile storage medium to register the device to be authorized as an authorized device with the data storage device.

In some embodiments, the access controller is further configured to generate the ephemeral unlock key pair comprising the public key and a private key.

In some embodiments, the access controller is further configured to derive a device-specific ephemeral unlock secret from (i) the public key of the ephemeral unlock key pair and (ii) a private key stored in the manager device, to encrypt key information for unlocking the data storage device.

In some embodiments, the access controller is further configured to discard the private key of the ephemeral unlock key pair and store the public key of the ephemeral unlock key pair on non-volatile memory of the data storage device.

In some embodiments, the access controller is further configured to calculate the blinded public key of the ephemeral unlock key pair by multiplying the public key of the ephemeral unlock key pair by the an unlock blinding key.

In some embodiments, the access controller is further configured to unblind the blinded public key multiplied by a private key stored on the manager device by calculating an inverse of the decrypted unlock blinding key and multiplying the blinded public key multiplied by a private key stored on the manager device with the inverse of the decrypted unlock blinding key.

In some embodiments, the unlock blinding key included in the challenge for the manager device, is protected from access by the manager device by way of encryption.

In some embodiments, the access controller is configured to encrypt the unlock blinding key using a response bundle wrapping key that is derived from a private key accessible by the access controller and protected from access by other devices.

In some embodiments, the access controller is further configured to store, on the non-volatile memory of the data storage device, encrypted authorization request data indicative of the device to be authorized having requested to be registered as an authorized device.

In some embodiments, the access controller is further configured to use the shared secret to decrypt the authorization request data; and the configuration data stored to register the device to be authorized as an authorized device is based on the authorization request data indicative of the device to be authorized having requested to be registered as an authorized device.

In some embodiments, the access controller is configured to register multiple manager devices with the data storage device as manager devices and the public key of the ephemeral unlock key pair is identical for each of the multiple manager devices.

In some embodiments, the shared secret is different for each of the multiple manager devices as a result of multiplying the blinded public key of the ephemeral unlock key pair by a private key stored on the manager device.

In some embodiments, the access controller is further configured to register the manager device as a manager device by:
  providing a challenge for the manager device, the challenge comprising the blinded public key of the ephemeral unlock key pair;

receiving a response to the challenge generated by the manager device, the response comprising the blinded public key multiplied by a private key stored on the manager device;

generating the shared secret based on the blinded public key multiplied by a private key stored on the manager device;

using the shared secret to encrypt configuration data on the non-volatile storage medium to register the manager device as a manager device with the data storage device; and discarding the shared secret.

In some embodiments, the configuration data comprises a manager key encrypted by the shared secret.

In some embodiments, the access controller is further configured to:

upon the device to be authorized requesting to be registered as an authorized device: store, on the non-volatile memory of the data storage device, encrypted authorization request data indicative of the device to be authorized having requested to be registered as an authorized device;

upon receiving the response to the challenge:

decrypt the authorization request data;

create a the configuration data to include at least part of the decrypted authorization request data;

use the shared secret to decrypt the manager key; and use the manager key to encrypt the configuration data.

In some embodiments, the access controller is further configured to encrypt the authorization data using a list entry key, to encrypt the list entry key, and store the list entry key in a header of the authorization request data.

In some embodiments, the list entry key is encrypted using a list entry key wrapping key that is derivable using a private key stored on the device to be authorized.

In some embodiments, the access controller is further configured to: locate a device entry corresponding to the manager device based on identifying information that identifies the manager device in the response; and decrypt the device entry using the shared secret to obtain key data to store the configuration data on the non-volatile storage medium to register the device to be authorized as an authorized device with the data storage device.

A method is performed by an access controller of a data storage device upon a device to be authorized requesting to be registered as an authorized device. The method comprises:

generating a challenge for a manager device, the challenge comprising a blinded public key of an ephemeral unlock key pair that is blinded by an unlock blinding key, the challenge further comprising the unlock blinding key in encrypted form, wherein the unlock blinding key is discarded from the data storage device after generating the challenge; wherein the host computer system is a first device;

the manager device is a second device; and the device to be authorized is a third device;

providing the challenge to the device to be authorized for sending the challenge to the manager device;

receiving a response to the challenge generated by the manager device, the response comprising the blinded public key multiplied by a private key stored on the manager device, the response further comprising the unlock blinding key in encrypted form;

decrypting the unlock blinding key and using the decrypted unlock blinding key to unblind the blinded public key multiplied by a private key stored on the manager device to thereby calculate a shared secret; and upon determining that the response indicates approval of registering the device to be authorized, using the shared secret to store configuration data on the non-volatile storage medium to register the device to be authorized as an authorized device with the data storage device.

A data storage device comprises:

means for generating a challenge for a manager device, the challenge comprising a blinded public key of an ephemeral unlock key pair that is blinded by an unlock blinding key, the challenge further comprising the unlock blinding key in encrypted form, wherein the unlock blinding key is discarded from the data storage device after generating the challenge; wherein the host computer system is a first device;

the manager device is a second device; and the device to be authorized is a third device;

means for providing the challenge to the device to be authorized for sending the challenge to the manager device;

means for receiving a response to the challenge generated by the manager device, the response comprising the blinded public key multiplied by a private key stored on the manager device, the response further comprising the unlock blinding key in encrypted form;

means for decrypting the unlock blinding key and using the decrypted unlock blinding key to unblind the blinded public key multiplied by a private key stored on the manager device to thereby calculate a shared secret; and means for, upon determining that the response indicates approval of registering the device to be authorized, using the shared secret to store configuration data on the non-volatile storage medium to register the device to be authorized as an authorized device with the data storage device.

BRIEF DESCRIPTION OF DRAWINGS

A non-limiting example will now be described with reference to the following drawings.

DESCRIPTION OF EMBODIMENTS1

Figure 1:
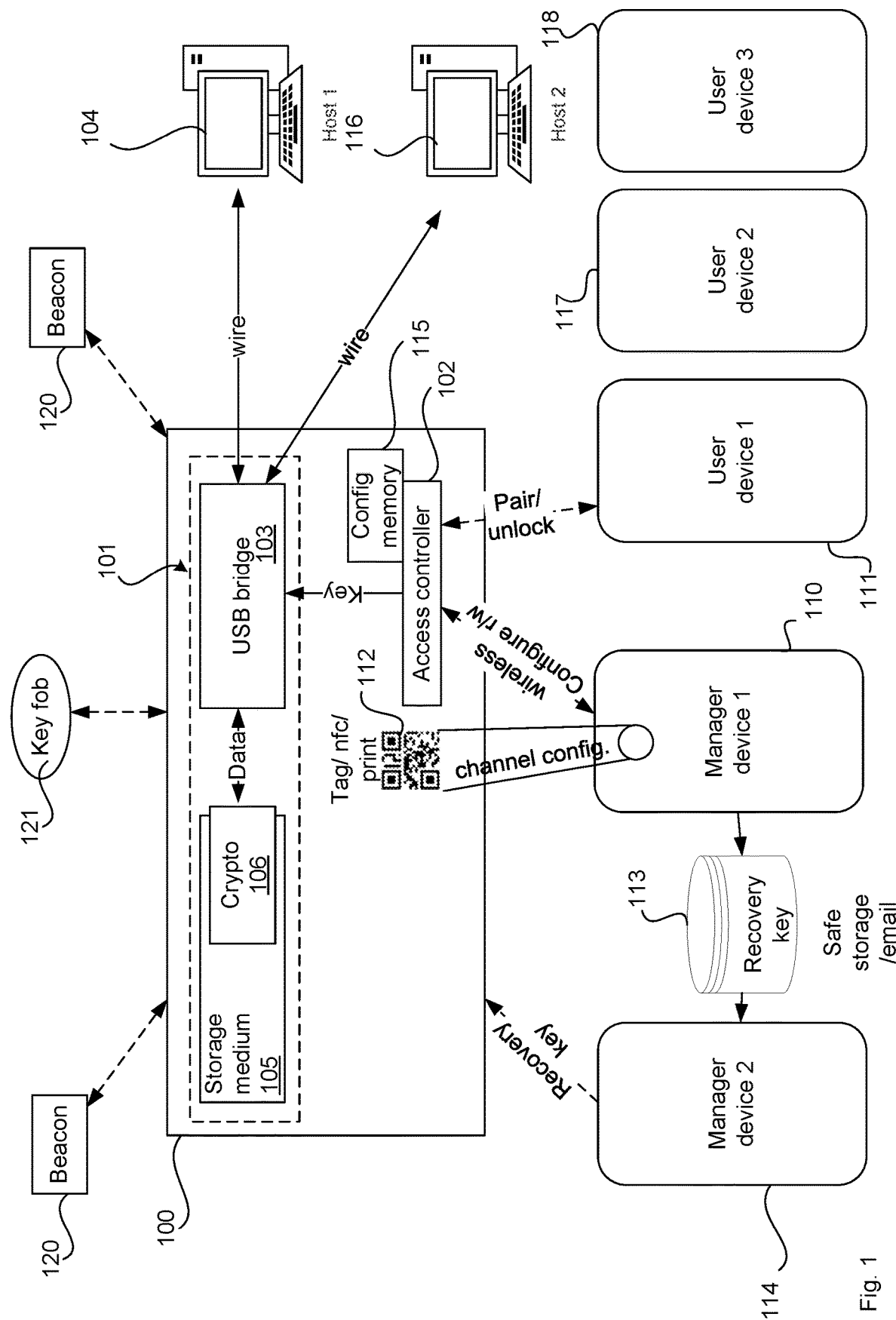
FIG. 1 illustrates a data storage device, according to an embodiment.

FIG. 1 illustrates a data storage device (DSD) 100 comprising a data path 101 and an access controller 102, according to an embodiment. The data path 101 comprises a wire-based data port 103, which is provided in FIG. 1 by a USB bridge, for transmission of data between a host computer system 104 and the DSD 100. In other embodiments, the data path 101 comprises a wireless data port (not shown) for wireless transmission of data between the host computer system 104 and the DSD 100. The DSD 100 registers with the host computer system 104 as a mass data storage device providing the functionality to the operating system of the host computer system 104 of a block data storage device. DSD 100 further comprises a non-transitory storage medium 105 to store encrypted user content data, noting that the user content data is the data that a user would typically want to store on a DSD, such as files including image files, documents, video files, etc. The storage medium may be a solid state drive (SSD), hard disk drive (HDD) with a rotating magnetic disk or other non-volatile storage media. Further, the storage medium may be a block data storage device, which means that the user content data is written in blocks to the storage medium 105 and read in blocks from the storage medium 105.

Command Set

In one example, storage medium 105 comprises a cryptography engine 106 in the form of a dedicated and/or programmable integrated circuit that encrypts data to be stored on storage medium 105 and decrypts data to be read from storage medium 105. In such examples, the storage medium may provide a Small Computer System Interface (SCSI) or Advanced Technology Attachment (ATA) command set according to the Opal specification by the Trusted Computing Group (TCG).

Program code stored on the cryptography engine 106 enables the cryptography engine 106 to receive, interpret and execute commands received from host computer system 104. For example, cryptography engine 106 may be configured to implement the standard ATA or serial ATA (SATA) and/or ATA Packet Interface (ATAPI) command set, which is available from Technical Committee T13 noting that identical functionalities can be implemented within TCG Opal, SCSI and other proprietary architectures. The command set comprises a READ SECTORS command with a command input of the count of sectors and the starting sector (noting that "sector" is used synonymously with "block" herein). Accordingly, there is a corresponding write command. It is noted that there is a data storage device driver installed on host computer system 104. The data storage device driver (not shown) uses the command set to provide high-level services to the operating system, such as file read functionalities. In some examples, the data storage device driver is a generic driver supplied as part of the operating system without support for device-specific encryption commands since the encryption functionality is hidden from the host computer system 104 and handled internally within DSD 100 as described below. This means that no additional drivers need to be installed to use the full functionality disclosed herein.

The command set provided by the cryptography engine 106 to the data port 103 (but not forwarded to host computer system 104) may include a command set from the ATA SECURITY feature set. In particular, the command set may include the command SECURITY SET PASSWORD or a corresponding command from TCG Opal to set a password for reading and writing user content data to the storage medium 105.

In this sense, cryptography engine 106 is connected between the data port 103 and the storage medium 105 and is configured to use a cryptographic key to encrypt user content data to be stored on the storage medium 105 and to decrypt the encrypted user content data stored on the storage medium 105 in response to a request from the host computer system 104. In some examples, the ATA SECURITY feature set is used only by data port 103 and not by host 104. That is, the access controller 102 provides the necessary input for the data port 103 to issue the ATA SECURITY commands to the cryptography engine 106. For example, the access controller 102 may provide a key to the data port 103, which the data port 103 then forwards to the cryptography engine 106 via the SECURITY SET PASSWORD command. The interface between the access controller 102 and the data port 103 may be an Inter-Integrated Circuit (I2C) bus, which is particularly useful in cases where this bus is already implemented in existing chips. However, it is possible to use many other communication architectures including bus, point-to-point, serial, parallel, memory based and other architectures.

Note that the separation of functionalities in dedicated chips as shown in FIG. 1 is only one possible example implementation. Therefore, it is possible to combine functionalities or split the functionalities further. For example, data port 103 may be integrated with access controller 102 into a single chip with a single core. In other cases, the data port 103 and the access controller 102 can be integrated with cryptography engine 106 into a single dedicated chip with a single core. Of course, all chips may have multiple cores.

In one example, the following components are used:
Data port 103: USB 3.1 Gen 2 10 gigabits per second (Gb/s) interface
Access controller 102: nRF52840 system-on-chip (SoC) from Nordic Semiconductor It is noted that for the functionality disclosed herein, the access controller 102 plays the leading role and will be described in more detail below, noting again that the tasks may be separated into separate chips in other examples. When reference is made to a 'configuration' of the access controller 102 or the access controller 102 being 'configured' to perform a certain step, this is to be understood to relate to program code that is stored on non-volatile memory in the DSD 100 on program memory (not shown for clarity) and executed by the access controller 102.

In other examples, some or all steps disclosed herein may be performed by hardware circuitry without program code. In particular, encryption primitives may be implemented by dedicated hardware circuitry for performance and security reasons. For example, commands that are particularly computationally demanding, such as elliptic curve multiplication or exponentiation, may be implemented by an Arithmetic Logic Unit (ALU) specifically designed for this calculation, such that the calculation can be performed in a single or a smaller number of processor cycles compared to using a sequential program in a general purpose microcontroller. It is further noted that the chips included in DSD 100 are microcontrollers, which means in this context that they do not run under an operating system that provides a hardware abstraction layer but the program code acts directly on the hardware circuit. While elliptic curve cryptography is used herein as examples for reasons of computational efficiency and security, it is noted that other public-key cryptosystems, such as the Rivest-Shamir-Adelman (RSA) cryptosystem, could equally be used.

Returning back to FIG. 1, there are a number of devices in addition to host computer system 104 that are external to the DSD 100 and that act in the process of unlocking the DSD 100 and providing a key to the cryptography engine 106 so that, ultimately, decrypted data in plain text can be provided to host computer system 104.

In particular, there is a first manager device 110, which is a mobile phone in most examples. Installed on the manager device 110 is an application ('app') to perform the following steps. In this way, the following steps can be implemented in software by the manufacturer of the DSD 100 and distributed to the manager device 110 through a commonly accessible app store, such as Apple's App Store or Google Play. The app installed on manager device 110 performs steps to take ownership of the DSD 100 at which point all data on the DSD 100 is erased or otherwise made inaccessible. For example, data may be crypto-erased by securely deleting all cryptographic keys stored on DSD 100.

For simplicity of presentation, this disclosure describes steps as simply being performed by manager device 110 if they are implemented by the app. The manager device 110 sets up the DSD 100, which means the various different keys are generated to support the process disclosed herein. Manager device 110 can register a user device 111 with the DSD (or approve a request created by the DSD 100), so that the user device 111 is then referred to as the "authorized device" 111. In most examples, the authorized device 111 is also a mobile phone with an app installed that implements the steps described as being performed by the authorized device 111. In other examples, the authorized device 111 is a desktop or laptop computer with a desktop app stored thereon. Other types of devices can be used as authorized devices, which will be explained below in relation to beacons and key fobs.

Use Cases

There are three main use cases managed by the access controller 102 in conjunction with the manager device 110 and the authorized device 111. First, the manager device 110 registers a user device 111 locally or approves a request created by the DSD remotely. This registers user device 111 with the data storage device 100 (specifically, the access controller 102), as one of possibly multiple authorized devices. The step of local registration (or "pre-authorization") would typically be performed while the DSD 100 is in possession of the manager who is operating the manager device 110 (and, therefore, while the DSD 100 and the manager device 110 are in proximity to each other) and before DSD 100 is provided to a user. The step of remote approval would be performed in case a new user device 111 requests authorization without the manager nearby. Second, the authorized device 111, on first connection to DSD 100 (specifically, access controller 102), re-enrolls once to complete the generation of the involved keys. This step ("re-enrolment") would typically be performed upon delivery of the DSD 100 to the user or the first time connection between the authorized device 111 and the DSD 100. Third, the authorized device 111 subsequently connects to the DSD 100 (specifically, the access controller 102) to unlock the DSD 100. This third step ("unlock") can occur multiple times and would typically be performed each time a user of the authorized device 111 wishes to access user content data after powering up the data storage device 100, such as by connecting it to a USB or other power source.

Taking Ownership

The first step in using DSD 100 after purchase, unpacking and power-up is to install the app on manager device 110 and register a device as the manager device 110. For this process, the manager device 110 obtains a unique identifier of the DSD from the DSD. This unique identifier is referred to as the identity key (IDK). In the example illustrated in FIG. 1, the identity key is encoded in a quick response (QR) code 112 which is affixed to an external surface of the DSD 100. The app installed on manager device 110 has access to a camera and has a software module that extracts the encoded information from an image of the QR code 112. The manager device 110 captures an image of the QR code 112 using the camera, and decodes the identity key of DSD 100 from the QR code. In one example, the QR code encodes a Uniform Resource Locator (URL). In that case, a generic app can capture the QR code, which then automatically directs the phone to an application store where the app can be downloaded. The URL also includes the identity key so that the app can decode that identifier once the app is installed. There may also be a short code provided, which can be used by a desktop app that may not have access to a camera or NFC tag reader.

In another example, manager device 110 may read another tag or NFC chip affixed or integrated with DSD 100 to obtain the identity key. Using that identity key, the manager device 110 can then initiate a communication, such as wirelessly (e.g., over Bluetooth), with the DSD 100 and in particular, with the access controller 102.

Recovery Key

Upon taking ownership of the DSD 100, the access controller 102 generates a recovery key and provides the recovery key to the manager device 110. The recovery key can then be stored on a secure storage 113 or printed and locked away. Ultimately, the recovery key can be used by a backup manager device 114 to assume the manager role that the manager device 110 previously had.

Local Registration of Authorized Device

Once the DSD 100 is initially configured during the take ownership process, manager device 110 registers the authorized device 111. Typically, there may be multiple authorized devices registered with a single DSD 100, so manager device 110 registers the authorized device as one of multiple authorized devices. More particularly, access controller 102 receives from the manager device 110 a public key associated with a private key stored on user device 111. The manager device 110 itself may have received the public key from the user device 111 via email, by scanning a QR code displayed on the user device 111 or any other way. At this point in time, device 111 is not yet authorized and therefore, simply referred to as "user device 111". Once user device 111 is authorized, it is referred to as "authorized device 111". Access controller 102 creates authorization data that indicates that user device 111 is an authorized device (as described below) and stores the authorization data associated with the public key on the configuration memory 115 to register the user device 111 as one of the multiple authorized devices. This means keys and other data associated with authorized device 111 are created and stored as described below. A user can then use the authorized device 111 to unlock the DSD 100 simply by bringing the authorized device 111 into wireless communication range, such as within Bluetooth range. Again, the steps performed by authorized device 111 are encoded in an app installed on authorized device 111. Depending on configuration parameters, the user may be required to unlock authorized device 111 before DSD 100 can be unlocked.

More particularly, access controller 102 has access to a non-volatile configuration data store, such as configuration memory 115, which may be a flash memory that is external to the access controller 102 (but may equally be integrated into access controller 102). Configuration memory 115 may also store the program code that implements the steps described herein as being executed by access controller 102. It is noted that some examples herein are configured under the assumption that an attacker can readily unsolder and read out the content of the configuration memory 115 but should not be able to decrypt the user content data with that information. That is, in those examples, no keys are stored persistently in plain text on configuration memory 115 or elsewhere in DSD 100 on non-volatile memory.

Once the cryptographic keys are available in plain text, they are stored only in volatile memory (not shown). This means that a power-down of the DSD 100 erases all cryptographic keys stored in plain text. Additional circuitry may be provided to reset all remaining charges on power-down, power-up or external reset, so that it is physically impossible in practice to recover any information from volatile memory. In many cases, power-down and erasure of all volatile memory occurs as a result of the user disconnecting the USB cable from the host computer system 104. In other examples, a secondary power supply is used which needs to be disconnected to power down the DSD 100 to delete the volatile memory.

Challenge-Response

Configuration memory 115 has stored thereon data that is specific for the registered authorized device 111. This data may be referred to as an identifier of the authorized device 111 or as a public key associated with a corresponding private key stored on the authorized device 111. The public key may be a "transport public key" (TPK) and is generated by the authorized device 111 on first launch of the app by executing an elliptic curve cryptography (ECC) primitive ECC-Pub ({transport private key}). (Recall that while elliptic curve cryptography is used herein as examples for reasons of computational efficiency and security, it is noted that other cryptographic techniques could equally be used.) The corresponding private key is stored on authorized device 111. The access controller 102 is configured to use the identifier (e.g., transport public key) or generate and store a further public key, to generate a challenge for the authorized device 111. It is noted here that the challenge is unique in the sense that each challenge is different, so that a subsequent challenge is different from any previous challenges. As described below, this is achieved by multiplying the stored data by a random blinding factor. Then, the access controller 102 sends the challenge to the authorized device 111 over a communication channel that is different from the data path. For example, the data path may include a wire-based USB connection while the communication channel between the access controller 102 and the authorized device 111 is a wireless (e.g., Bluetooth) connection.

In one example, a re-enrolment process takes place responsive to the authorized device connecting with the DSD 100 for the first time after the authorization data was created and stored on configuration memory 115 associated with the transport public key of the authorized device 111 received from the manager device 110. During the re-enrolment process, DSD 100 updates the authorization data and, as set out below, requests the authorized device 111 to generate an unlocking public key (and a corresponding unlocking private key). The authorized device 111 then provides the unlocking public key to the access controller 102. The access controller 102 stores the unlocking public key in field 212b, thus overwriting the transport public key 212a.

Accordingly, following the re-enrolment process, the authorized device 111 stores two private keys, namely the transport private key and the unlocking private key. These two private keys (transport private key and unlocking private key) can be stored separately on the authorized device 111, and each of the two private keys can have different access policies associated with that key. For example, the transport private key may be accessible at any time, even if the authorized device 111 is locked (e.g., by a screen lock or time out), so as to allow continuous communication between authorized device 111 and DSD 100. To unlock DSD 100, however, the access policy of the unlocking private key may require that the user unlocks authorized device 111, enters a personal identification number (PIN), provides biometric or other authentication.

The use of the unlocking private key in association with a different access policy. This way, DSD 100 cannot be unlocked by a stolen authorized device. Since unlocking DSD 100 is performed only once while DSD 100 is powered, the increased security does not significantly reduce user convenience.

The authorized device 111 can calculate a response to the challenge that cannot be calculated by any other device that is not registered with the DSD. More specifically, the correct response cannot be calculated by a device that does not have access to data that corresponds to the identifier of the authorized device 111 stored on configuration memory 115. For example, authorized device 111 uses the stored unlocking private key that is associated with the corresponding unlocking public key stored on configuration memory 115, to calculate the response to the challenge.

The access controller 102 receives the response to the challenge from the authorized device 111 over the communication channel. It is noted here that if the access controller 102 simply validates the response to the challenge and upon success, reads the cryptographic key from configuration memory 115, the cryptographic key would be stored in plain text, which is undesirable since this would enable an attacker to disassemble the DSD 100 and read the key from configuration memory 115 to access the user content data stored on storage medium 105.

Calculate Key

So, instead, access controller 102 calculates the cryptographic key based at least partly on the response from the authorized device 111. This means the cryptographic key is not a pure function of the response but involves other values as described in more detail below. In summary, the cryptographic key is stored in encrypted form on configuration memory 115 and the response, which is based on the private key stored on the authorized device, enables the calculation of the secret that decrypts the cryptographic key.

Throughout this disclosure, reference may be made to 'wrapping' of keys, which simply means that the key is encrypted by another key (i.e., by the "secret"). In many cases of 'wrapping' the encryption is symmetric such that a single secret (key) exists that can decrypt the encrypted key (without a public key associated with the secret). In one example, symmetric encryption uses the Advanced Encryption Standard (AES) primitive.

Finally, access controller 102 provides the cryptographic key to the cryptography engine 106 (via data port 103 in this example) to decrypt the encrypted user content data stored on the storage medium 105 of the DSD 100. As mentioned above, once the access controller 102 has calculated the cryptographic key, the access controller 102 provides the cryptographic key to the data port 103 in plain text and the data port 103 issues the SECURITY SET PASSWORD command to the cryptography engine 106 including the cryptographic key.

It is noted that where reference is made to 'unlocking' the device, this can refer to the entire process described above including the challenge, the response to the challenge and sending of the cryptographic key to the cryptography engine 106 to allow plain text read commands issued by the host computer system. In other examples, the challenge and the response to the challenge are considered as being part of a separate 'connect' step. During the following 'unlocking' step the access controller 102 then sends the cryptographic key to the data port 103 to allow access to the user content data.

It is noted, as an aside, that it may be possible for an attacker to eavesdrop on the key transmission from the access controller 102 to the data port 103 and then to the cryptography engine 106. However, the transmission of the key is not over a public network, so this eavesdropping would require gaining access to and disassembling the unlocked DSD without removing power from the DSD 100. This scenario may be discarded as a threat since in this scenario the user content data is available anyway on host computer system 104. In other words, while the DSD 100 is connected and unlocked, data is available to the rightful user and the attacker. But once the user disconnects the DSD from host computer system 104, this eavesdrop attack is not possible anymore. Therefore, this attack is not further considered.

For completeness it is noted that once the cryptography engine 106 has received the cryptographic key, the host computer system 104 can issue ordinary READ SEGMENT commands and transparently access the encrypted data without any perceivable difference to accessing an unencrypted device. This is particularly the case where the cryptography engine has hardware cryptography modules to enable encryption and decryption at or above the read and write speed of the storage medium 105 and/or the data port 103. However, the user can disconnect the DSD 100 to lock it. This way, the DSD 100 can be carried by the user through insecure locations where the DSD 100 can be lost or stolen, but it is very difficult for another person to decrypt the encrypted user content data stored on storage medium 105. If the user maintains possession of the DSD, the user can connect it to a second host computer system 116, conveniently unlock the DSD 100 with his authorized device 111 (e.g., phone) and readily access the encrypted user content data stored on the storage medium 105.

For user convenience, the data port 103 can be configured such that if the DSD is locked, it registers with host computer system 104 as a mass data storage device with storage medium not present, similar to an SSD card reader with no card inserted. Once the authorized device 111 is connected to DSD 100 and the DSD 100 is unlocked, data port 103 switches to storage medium present, similar to a card reader that had an SSD card inserted. Such a configuration would avoid any warnings from being generated by the operating system of the host computer system 104 about the data not being accessible or access being denied. Instead, all user interaction would be performed by the app installed on the authorized device, which is fully controlled by the manufacturer of the DSD, so user experience can be optimized. As shown in FIG. 1, there may be further mobile phones acting as authorized devices 117 and 118.

Beacons and Key Fobs

Considering FIG. 1 again, it can be seen that there are further devices, such as beacons 120 and key fob 121. These devices can also be considered as "authorized devices" since they can operate essentially the same as the authorized device 111. Before initial registration by the manager device 110, these devices are referred to as "device to be authorized". When reference is made to a "user device" herein (mainly describing mobile phone 111 before initial registration), this also applies to the beacons 120 and key fob 121 except when noted otherwise, such as in cases where user input is required. Beacons 120 and key fob 121 also have their own private key stored securely so that they can respond to a challenge that is specific for one beacon or key fob. However, since the beacons 120 and key fob 121 have no user input, the initiation of communication may be slightly different. More particularly, beacon 120 and key fob 121 may periodically send advertisements to broadcast their existence and the DSD 100 then initiates the communication with beacon 120 and/or key fob 121, which prompts them to send their transport public key. This is in contrast to the authorized device 111, which sends the transport public key to the DSD 100 to initiate the communication.

In further examples, beacons 120 are in a de-activated state when they are powered up and need to be activated by a manager device 110 or an authorized device 111. This activation may follow a similar process as unlocking DSD 100. That is, manager device 110 or authorized device 111 or both are registered with each beacon 120 with their transport public keys and respond to a challenge as described herein. Thus, a device may be registered as a manager device or an authorized device with one of the beacons 102 and/or key fob 121 without being registered with the DSD 100 itself. If the response to the challenge is valid, beacons 120 then unlock DSD 100. In yet a further example, beacons 120 are registered with each other, such that manager device 110 and/or authorized device 111 need to activate only one of the beacons 120 and the remaining beacons become activated automatically. In other words, the activation 'spreads' through the beacon network as long as the beacons are in range of each other.

It is noted that the only piece of information that the authorized devices 111, 117, 118, 120 and 121 provide to the manager device 110 to become registered is one public key for each device. In other words, each device provides its own public key corresponding to a private key that is securely stored on that device. Therefore, if an attacker intercepts the initial communication between one of the devices 111, 117, 118, 120 and 121 and the manager device 110, the only information that the attacker can obtain is the public key. As the name suggests, the public key is not secret and can be generally known. Therefore, the attacker has not gained any advantage. Further, the manager device 110 cannot use the public key to gain access to anything else related to the authorized devices. For example, the manager device cannot decrypt or unlock any other data storage devices with which the authorized device has been registered by other manager devices.

The access controller 102 receives the public keys of the authorized devices from the manager device 110 and generates authorization data. Access controller 102 stores the authorization data on configuration memory 115 waiting for the authorized device to connect for the first time. On the first connection, access controller 102 performs a challenge-response for the authorized device and upon success, updates the authorization data to indicate that the authorized device is now fully registered. This first connection process is referred to as "re-enrolment" herein and details of generating the authorization data and the re-enrolment are provided below.

Elliptic Curve Cryptography

In one example, the challenge generated by the DSD 100 and sent to the authorized device 111 is based on elliptic curve cryptography. This has the advantages of shorter keys, which leads to more efficient communication and storage. Further, a large number of phones currently on the market provide dedicated functionality of elliptic curve cryptography within a secure hardware module. The secure hardware module securely stores the user's private keys and performs cryptographic primitives within the secure hardware module without the key leaving the secure hardware module and being sent to a general purpose processor core where the key may be subject to an attack for unauthorized retrieval. In one embodiment, the secure hardware module includes a separate processor that executes its own microkernel, which is not directly accessible by the operating system or any programs running on the phone. The secure hardware module can also include non-volatile storage, which is used to store 256-bit elliptic curve private keys. In one embodiment, the secure hardware module is a Secure Enclave coprocessor that is available on some Apple devices.

Authorized Device Data Record

Figure 2A:
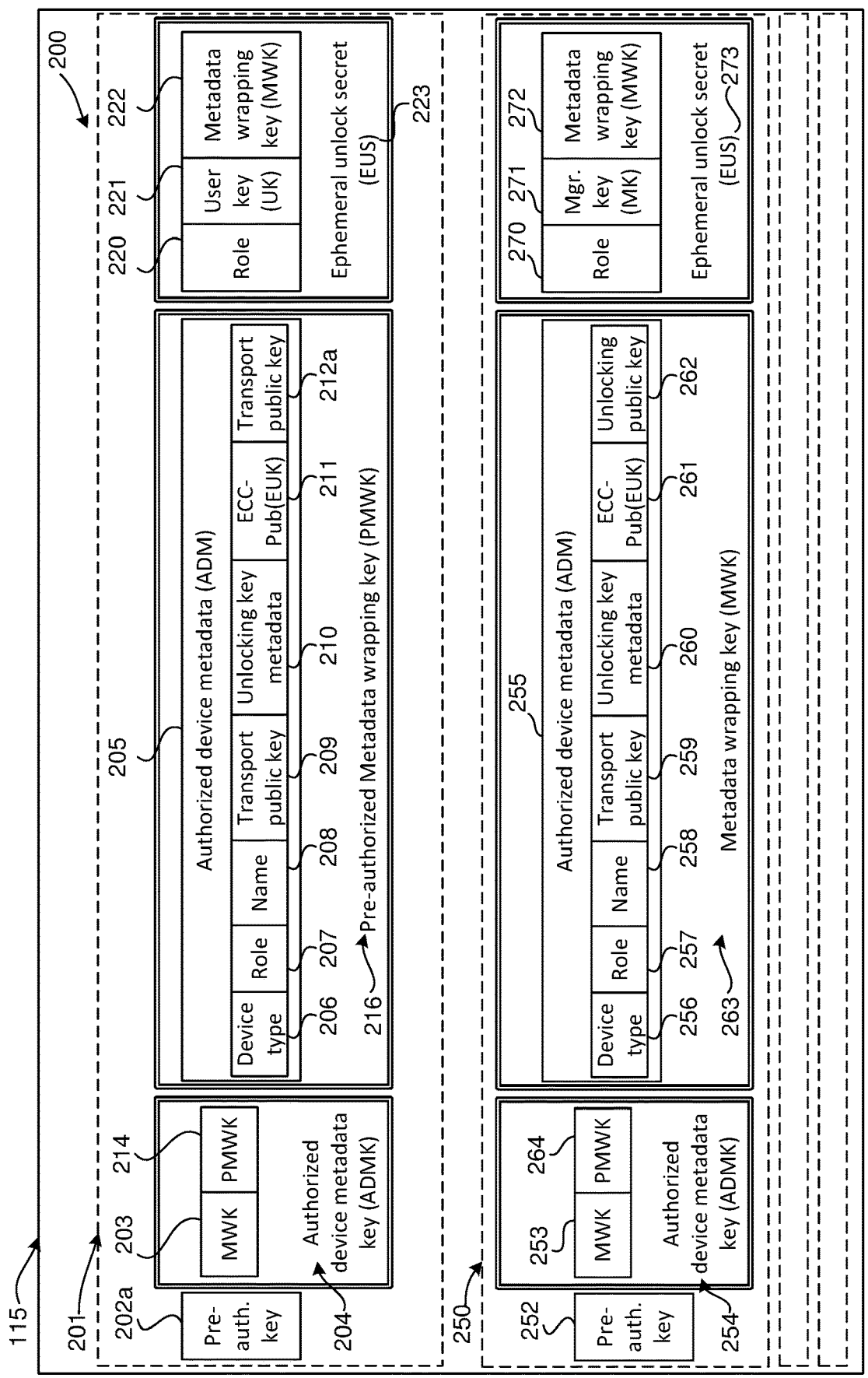
FIG. 2a illustrates a section of the configuration memory of the data storage device of FIG. 1 after registration of authorized user device, according to an embodiment.
Figure 2B:
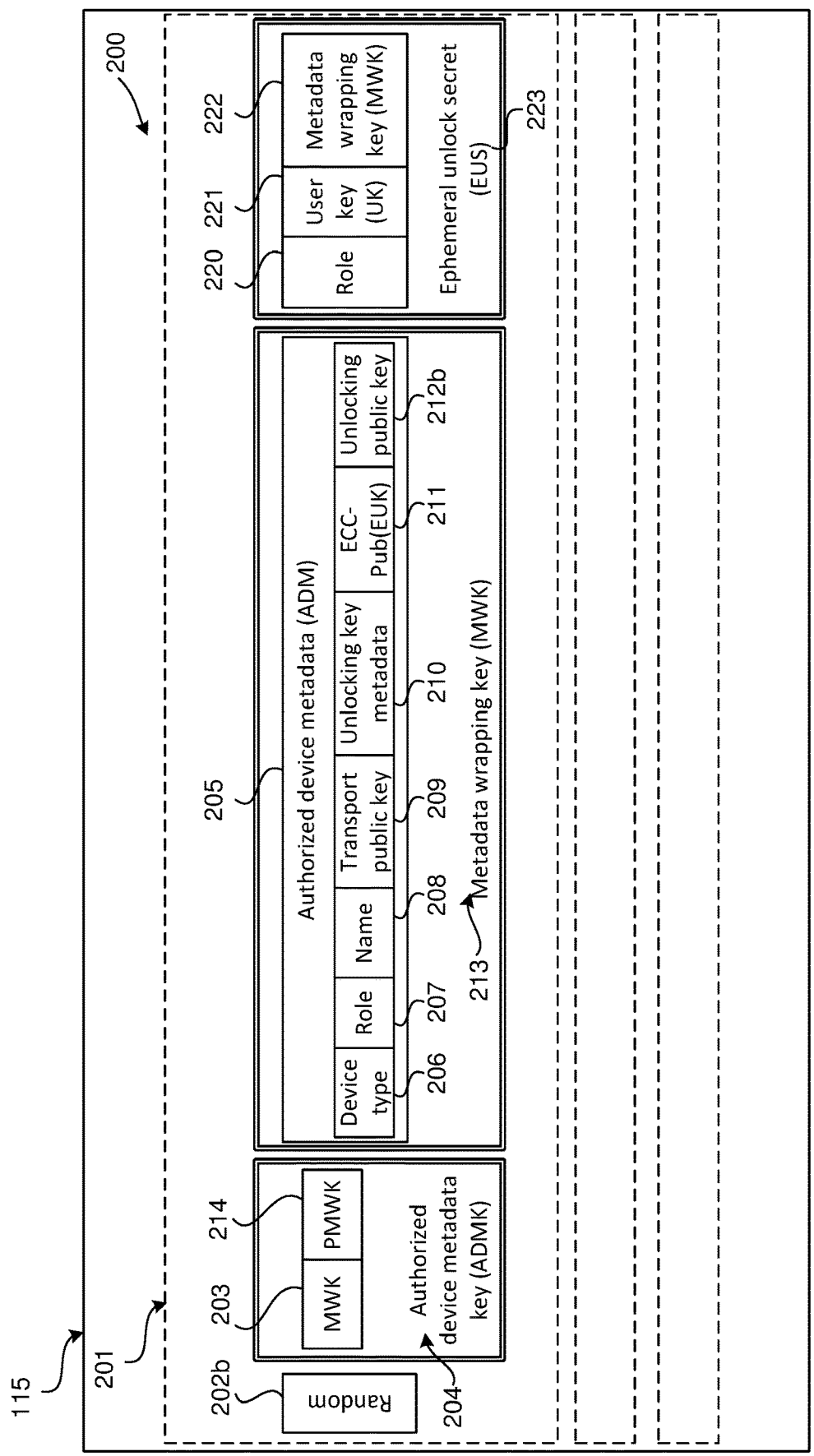
FIG. 2b illustrates a section of the configuration memory of the data storage device of FIG. 1 after re-enrolment of a user device, according to an embodiment.

FIGS. 2a and 2b illustrate a section of configuration memory 115, at different times, according to an embodiment. More specifically, FIGS. 2a and 2b both illustrate a first record 201, in configuration memory 115, which is associated with one of multiple authorized devices and referred to herein as "authorization data". There is also a second record 250 that relates to a manager device and is described further below. FIG. 2a illustrates record 201 prior to re-enrolment of the authorized device associated with record 201. FIG. 2b illustrates record 201 after the re-enrolment of the authorized device associated with record 201. FIG. 2b does not show second record 250 for clarity.

Further data records for further authorized devices are schematically indicated as empty dashed boxes but not considered in detail as they operate in a similar manner to record 201. In particular, each further data record comprises authorization data generated by the access controller 102 in response to receiving a public key of a user device from the manager device 110 and then updated during the first connection of the user device (then "authorized device"). For convenience, the data structure of configuration memory 115 is referred to as a 'table' comprising one or more 'records', where each record relates to one registered authorized device and each record has multiple fields. It is noted, however, that other data structures can be used, such as JavaScript Object Notation (JSON), Extensible Markup Language (XML), binary formats, etc. In one example, each entry has a fixed length and the table has a fixed number of rows (i.e., entries). Within this disclosure, a 'record' may also be known as a 'row' or 'entry'.

Record 201 comprises a field for a pre-authorization key 202a, which is used responsive to the authorized device 111 connecting to the DSD 100 for the first time. During this first connection, access controller 102 performs a number of steps that are referred to as "re-enrolment" as described below in more detail. The pre-authorization key 202a is generated from the identifier (e.g., the transport public key) of the authorized device 111. For example, access controller 102 may generate the pre-authorization key 202a by applying a key derivation function using the x-coordinate of the transport public key as an input parameter together with an authorized device slot key as salt value to the derivation function. The authorized device slot key may be a pseudo-random number (e.g., 16-bytes) stored on configuration memory 115 and can be used to encrypt data in authorized device certificates so that only the issuing DSD 100 can recover the information.

At that point, it can be said that the records stored on the configuration memory 115 are indexed by preauthorization key 202a based on an identifier of the authorized device (e.g., the transport public key). As described below with reference to FIG. 4, the index of record 201 may be stored in a certificate, as a slot number, during re-enrolment. Accordingly, during re-enrolment, the pre-authorization key 202a, which forms an authorization data record index, can be replaced by a random value 202b to make the configured DSD indistinguishable from a new device from the factory even with possession of the transport public key.

Record 201 further comprises a field for a first copy of a metadata wrapping key (MWK) 203 and a pre-authorization metadata wrapping key (PMWK) 214. Some fields in record 201 are encrypted which is indicated by double-lined boxes, where the single solid line boxes, inside the double-lined boxes, indicate the 'payload' such as the metadata wrapping key 203 and the pre-authorization metadata wrapping key 214. The corresponding encryption key, used to encrypt the payload, is noted at the bottom of the double-lined box. So, for example, metadata wrapping key 203 is encrypted by an authorized device metadata key (ADMK) 204. It should be noted that each encryption box may comprise an additional nonce that is concatenated with the payload data. This guarantees that the encrypted entry cannot be distinguished from random data even with the possession of the encrypted data, such as the transport public key of the authorized device.

Record 201 further comprises a field for authorized device metadata (ADM) 205, which is a concatenation of a device type 206 (e.g., recovery key, key fob, beacon, phone, computer, watch, etc.), a role of the device 207 (e.g., manager or user), a name of the device 208 (e.g., "John's phone"), a transport public key 209, unlocking key metadata 210 (e.g., key restrictions of whether fingerprint, pin or no unlock is required), an ephemeral public key 211, and an unlocking public key 212b. In one embodiment, the ephemeral public key 211 is an elliptic curve public key generated from a random ephemeral private key (EPK) using an Elliptic Curve Cryptography (ECC) primitive ECC-Pub (EUK). The ephemeral private key is not stored on configuration memory 115 or on the authorized device 111 but is discarded after creating the ephemeral public key. This means that the ephemeral private key is not stored on non-volatile memory but only on volatile memory. As result, a power-down of the memory leads to complete and irrecoverable loss (e.g., destruction) of the ephemeral private key. In some examples described below, all devices use the same ephemeral public key ECC-Pub (EUK) that is generated once at factory reset or take ownership. The unlocking public key 212b corresponds to an unlocking private key stored on authorized device 111 and is generated by authorized device 111 and provided to the access controller 102 during re-enrolment.

The authorized device metadata (concatenated with a further nonce) is encrypted by the metadata wrapping key (MWK) 213 that is also stored in encrypted form at 203. The main purpose of storing the encrypted metadata wrapping key 203 in entry 201 is to allow a manager user, who has access to the authorized device metadata key 204, to access the encrypted authorized device metadata 205. If the metadata wrapping key was not accessible to the manager, the manager would not be able to retrieve from the DSD 100 any information about which authorized devices are currently registered. In one example, the authorized device metadata key 204 is a single key for all authorized devices and is stored encrypted by a manager key. The manager key may be a pseudo-random value (e.g., 32 bytes) and generated by access controller 102 responsive to storage medium 105 being erased. The manager key is encrypted and stored for each paired manager device 110/114.

Record 201 further comprises a field for a second copy of device's role 220 concatenated with a user key 221 and a second copy of the metadata wrapping key 222. It is noted that both role 207/220 and metadata wrapping key 203/222 are stored in two copies, which are identical but encrypted using different keys. The purpose of storing two copies of the role 207/220 is to enable the access controller 102 to verify the role during connection (responsive to the authorized device metadata being decrypted) as well as during unlocking (responsive to the user key 221 being decrypted). The purpose of storing the first copy of the metadata wrapping key 203 is to provide it to a manager device having access to the authorized device metadata key. The purpose of the second copy of the metadata wrapping key 222 is to provide it to a pre-authorized device during the re-enrolment step that occurs in response to first connection of the authorized device 111 to the DSD 100. The concatenated values 220, 221, 222 together are encrypted by an ephemeral unlock secret (EUS) 223 that could be generated by a Diffie-Hellman method using the ephemeral private key corresponding to ephemeral public key 211 and the unlocking public key 212b. The ephemeral unlock secret 223 can also be generated using the ephemeral public key 211 and an associated unlocking private key stored on the authorized device 111 and corresponding to unlocking public key 212b. In other words, the ephemeral unlock secret 223 is generated during the re-enrolment step that occurs in response to the first connection of the authorized device 111 to the DSD 100. The ephemeral unlock secret 223 is generated by the access controller 102 using the ephemeral private key and the unlocking public key 212b. It is noted that the ephemeral private key itself is not stored but nevertheless, the ephemeral unlock secret 223 can be recovered as described above. This means, the user key 221 is decryptable based on the response from the authorized device. It is noted that the user key 221 is identical for all authorized devices and can be used to decrypt user content data. This does not necessarily mean that the user key itself decrypts the user content data. There may be further keys that the user key decrypts and the final key decrypts the user content data. The terms "using a key to decrypt user content data" and "enable decryption of the user content data" refer to indirect encryption via multiple keys in a chain. In contrast "the key decrypts the data" refers to direct decryption of the data with the key, such as modulo multiplication of the encrypted data by the key. Here, the user key 221 is used to decrypt the data indirectly and may be the starting point of a chain of keys that are decrypted sequentially until finally, the chain ends at the key that decrypts the user content data. While in most examples disclosed herein, the ephemeral unlock secret 223 decrypts the user key 221, it is also possible that the cryptographic key is derived from the response to the challenge in other ways. For example, the response to the challenge may directly be used as the cryptographic key that decrypts the user content data.

This allocation of keys and metadata enables a configuration where the entire configuration information about authorized devices, manager devices, and other aspects is stored on the DSD 100 itself. However, the authorized devices require a key stored on the respective authorized device to unlock the DSD 100. If an unregistered user without access to any keys wants to access the entire configuration of the device, such as retrieve a list of registered devices, the unregistered user would need only the recovery key to become registered as a manager device and gain access to the manager key. The DSD 100 can then provide the entire contents of configuration memory 115 to the new manager device using the manager key. Further, there can be two manager devices and both can register or remove authorized devices. The other manager device would be able to obtain configuration updates by synchronizing its own records with the data stored on configuration memory 115. In some examples, the DSD 100 is configured to erase records 201 of all authorized devices (but not delete the user content data or the user key 221, which may be stored as another copy in encrypted form on configuration memory 115 separate from entry 201 and other entries) if the recovery key is used to gain access but that is a policy decision.

Figure 3:
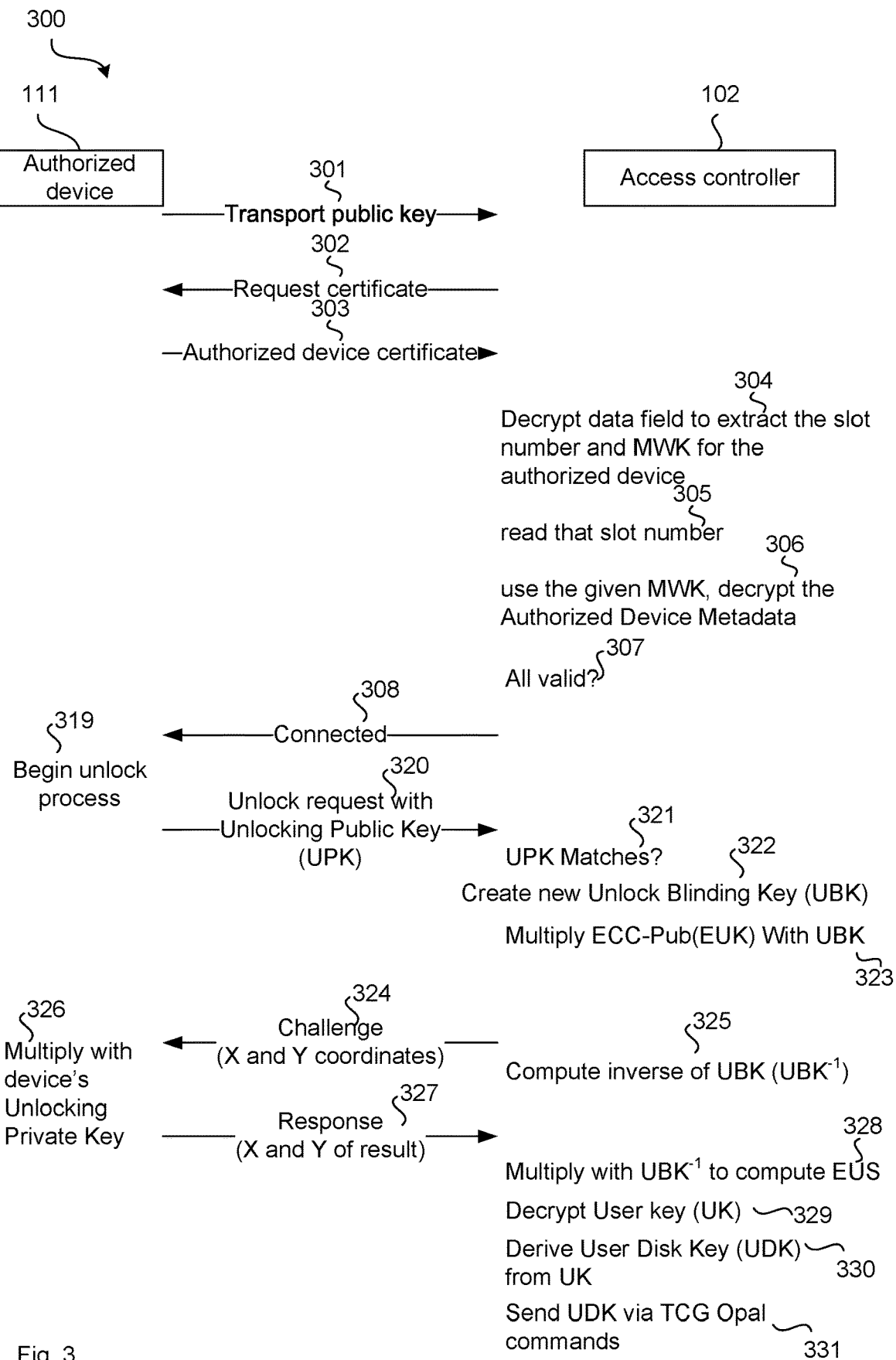
FIG. 3 illustrates a control flow between the authorized device and the access controller of FIG. 1, according to an embodiment.

FIG. 3 illustrates the control flow 300 between an authorized device 111, that has been re-enrolled with the DSD 100, and an access controller 102, according to an embodiment. First, the authorized device 111 initiates a connect method by sending 301 its transport public key. This step can be easily re-played by an attacker. Access controller 102 then replies 302 with a request for a certificate and in response to this request, authorized device 111 sends 303 a certificate previously obtained from the access controller 102 through the re-enrolment process.

Certificate

Figure 4:
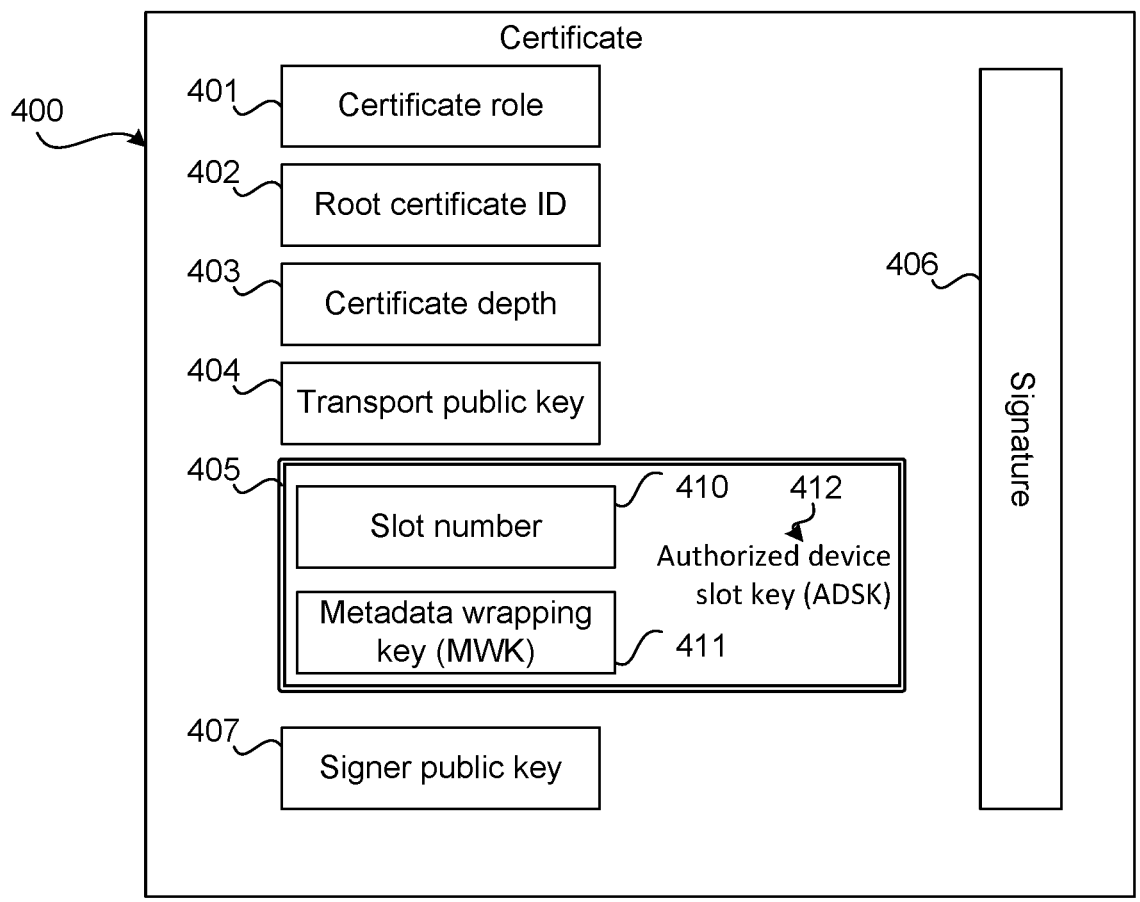
FIG. 4 illustrates a certificate issued by the data storage device and sent by the authorized device to the data storage device to unlock the data storage device, according to an embodiment.

FIG. 4 illustrates a certificate 400 issued by the data storage device 100 to the authorized device 111 during re-enrolment of the authorized device 111 to the data storage device 100, according to an embodiment. The authorized device 111 sends a copy of certificate 400 to the DSD 100 to unlock the DSD 100 during the unlocking step.

In this example, the certificate 400 comprises multiple type-length-value (TLV) fields, where the type value indicates the kind of field that is part of the certificate, length is the size of the value field (typically in bytes), and value is a variable-sized series of bytes which contains data for this part of the certificate.

Certificate 400 begins with a TLV atom that indicates the type of certificate that follows. This is referred to as the certificate role 401 and has a 2 byte value to indicate that this is an authorized device certificate.

Certificate 400 belongs to a certificate chain. Access controller 102 uses the chain to validate and authenticate certificate 400. To indicate which chain certificate 400 belongs to, certificate 400 has a 4 byte root certificate identifier (ID) 402. The certificate identifier of each certificate in the certificate chain is the same. Certificate identifiers that do not match indicate an invalid certificate. In one example, a root certificate identifier indicates whether the certificate chain is a production or a development certification chain. In other examples, other groups may be indicated by respective certificate identifiers.

Certificate 400 further comprises a 1 byte indicator of certificate depth 403. A certificate's depth is defined as its distance from the root certificate within its certificate chain. The root certificate is defined to have a depth of zero. As a given certificate chain is processed the depth fields are validated to ensure integrity of the chain.

Certificate 400 also comprises a 64 byte certificate transport public key 404 (e.g., according to the National Institute of Standards and Technology (NIST) P-256 elliptic curve).

Each certificate is denoted/indexed via a transport public key. Each type of public key will have its own dedicated tag type. That is, the tag type will denote the cipher suite used to generate the transport public key, such as the P-256 cipher suite.

Certificate 400 further comprises a data field 405 (explained below) and is authenticated via a signature 406. Access controller 102 receives certificate 400 and validates the signature before trusting or using any of the certificate's contents. To enable signature validation, the 64 byte signer public key 407 is provided as part of the certificate. The signature 406 itself is 64 bytes in length and computed over all prior TLVs 401-405, 407 encountered within the certificate, regardless if they are recognized by the implementation or not. More particularly, the signature 406 is derived from a hash of the certificate data. The specific data that is signed is certificate dependent, but contains all TLVs used to represent the certificate, including TLVs that are not recognized. The key used to generate the signature is a logical identity key (LIK) and is associated with signer public key 407. The logical identity key is generated during the take-ownership process. This invalidates any previously generated logical identity keys or certificates.

Data field 405 comprises the slot number 410, which denotes the index of the record 201 within configuration memory 115. Data field 405 also comprises a further copy of the metadata wrapping key 411 (in addition to the two copies shown in FIG. 2*a*). The data field 405 is encrypted with the authorized device slot key (ADSK) 412, which is a 16 byte pseudo random value stored in configuration memory 115 and is used to encrypt data in authorized device certificates so that only the issuing DSD 100 can recover the information.

Unlocking the Data Storage Device

Returning to FIG. 3, if the authorized device 111 wishes to unlock the DSD 100, the authorized device 111 sends 303 the certificate 400, which includes the encrypted metadata wrapping key (MWK) 213/411 to access controller 102. The certificate 400 also includes the slot number 410, which is an index of the record 201 in configuration memory 115.

Access controller 102 uses the authorized device slot key stored in configuration memory 115 to decrypt 304 data field 405, and extract the slot number and metadata wrapping key. Access controller 102 then queries configuration memory 115 to read 305 the appropriate record 201 from configuration memory 115 and decrypts 306 the authorized device metadata 205 using the metadata wrapping key. This yields the ephemeral public key 211, which may also be referred to as an identifier of the authorized device because it uniquely identifies the authorized device since the ephemeral public key 211 is cryptographically associated with an unlocking private key stored only on authorized device 111. Access controller 102 may perform additional checks 307, such as validate that the transport public key 209 included in the authorized device metadata 205 matches the transport public key 404 presented in the certificate 400. Further, access controller 102 validates the role 401 against the valid set of values, and associates the role with the connection. This means that access controller 102 is aware of the current role (authorized device or manager device) during the duration of connection. For example, access controller 102 stores a parameter value on volatile memory that indicates the role 401 provided in the certificate. If any of the preceding checks fail, the authorized device is deemed to be revoked and an error to that effect is issued. Otherwise, the connection attempt succeeds and the access controller 102 sends 308 a connected confirmation message to the authorized device 111.

At this stage, the authorized device 111 is connected and the unlock process begins 319 by the authorized device 111 sending 320 an unlock request to access controller 102. The unlock request includes the unlocking public key associated with the private unlocking key stored on the authorized device's secure hardware module. Access controller 102 matches 321 the received unlocking public key against the unlocking public key 212*b* stored in the authorized device metadata record 205. Next, access controller 102 generates 322 a new blinding value (also referred to as unlock blinding key (UBK)), which essentially is an ephemeral private scalar and is generated randomly.

Access controller 102 then generates the challenge based on the identifier of the authorized device (e.g., ephemeral public key 211) multiplied by the unlock blinding key (UBK). More particularly, access controller 102 multiplies 323 the ephemeral public key 211 by the unlock blinding key, returning the full X and Y coordinates of the result, noting that this operation is performed on an elliptic curve. Access controller 102 then sends 324 the X and Y coordinates to the authorized device 111 as the challenge. It is noted here that this challenge is based on the identifier of the authorized device 111 because the ephemeral public key is one factor of the multiplication resulting in the challenge. It is further noted that for each unlock request (i.e., 320) a different unlock blinding key is generated to avoid man-in-the-middle attacks.

Further, access controller 102 computes 325 the inverse of the unlock blinding key ($UBK^{-1}$). The access controller 102 can compute the inverse of the unlock blinding key while waiting for a response from the authorized device 111.

The authorized device 111 calculates a response to the challenge by multiplying 326 the challenge with the unlocking private key, which is stored in the authorized device's secure hardware module and which corresponds to unlocking public key 212*b* stored on configuration memory 115. This may involve the execution of a cryptographic primitive that can be executed entirely within the secure hardware module within the authorized device 111. Authorized device 111 then sends back 327 the result in a response message. Access controller 102 multiplies 328 the returned result with the inverse of the unlock blinding key to compute the ephemeral unlock secret (EUS) 223.

In mathematical notation, P represents the ephemeral public key, and k represents the unlock blinding key created at step 322 in FIG. 3. Access controller 102 calculates 323 the product k*P and sends 324 it to the authorized device 111. The authorized device 111 multiplies 326 the challenge with the unlocking private key j to calculate j*k*P and returns 327 the result to access controller 102. The access controller 102 multiplies 238 this response with the inverse of the unlock blinding key $k^{-1}$ to calculate $$k^{-1}*j*k*P$$

which is equal to j*P due to commutative nature of elliptic curves $$(\text{i.e.}, k^{-1}*j*k*P = k*k^{-1}*j*P = j*P).$$

Access controller 102 then uses j*P as the ephemeral unlock secret (i.e., key) to decrypt 329 user key 221. That is, access controller 102 uses the ephemeral unlock secret to decrypt the user key 221, stored on the DSD 100, which is encrypted with the ephemeral unlock secret. More particularly, access controller 102 decrypts 329 the user key, which then decrypts 330 a "user drive key", which is then, finally, sent 331 to cryptography engine 106 via TCG commands. That is, the user drive key may be generated by access controller 102 using a key derivation function based on the user key. The user drive key is the TCG credential used to unlock the DSD 100 and may be equated to the "cryptographic key" described herein. In the case of Opal, this is the User2 credential.

It is noted that the access controller generates the ephemeral unlock secret during the re-enrolment process by deriving a symmetric key from the result of an Elliptic Curve Diffie-Hellman process using the unlocking private key stored on the authorized device 111 and the unlocking public key 212b. The resulting key is used to encrypt the user key 221 but not stored in DSD 100. Instead, the access controller re-generates the ephemeral unlock secret 223 each time an authorized device requests to unlock the DSD 100, as described above.

In a further example, the unlocking private key j, in the equations above, can be replaced by a product of the unlocking private key with a value derived from a passphrase. The unlocking private key would still be stored in the secure hardware module of the authorized device but the unlocking private key alone would not be able to decrypt the user content data stored on the DSD 100. Instead, the user needs to enter the passphrase to calculate the response to the challenge and send 327 that response. This would simply replace j above with the product of j with the passphrase value. The DSD would be oblivious of that change because the ephemeral unlock secret 223 would be generated in the same way as above from the view of the access controller 102.

Registration

As set out above, there are three scenarios: First, the manager device 110 locally or remotely registers a user device 111 once as one of multiple authorized devices. Second, the authorized device 111, on first connection with the access controller 102, re-enrolls once to complete the generation of the involved keys. Third, the authorized device 111 subsequently connects with the access controller 102 to unlock the DSD 100. This third scenario can occur multiple times.

During the local registration scenario, initiated by the manager device 110, the access controller 102 receives from the manager device 110 a public key, e.g. a transport public key, corresponding to a private key stored on the user device 111. In response, the access controller 102 creates authorization data, as illustrated by data record 201 in FIG. 2a.

Access controller 102 generates the pre-authorization key 202a that is essentially an index to locate the record 201. The pre-authorization key 202a is generated by a key generation function using the x coordinate of the received transport public key 209 and a salt value. The salt value may be an authorized device slot key, which may be a 16-bytes pseudo-random value generated during the "take ownership" process, stored on the configuration memory 115, and not shared with the authorized device. This way the salt can be different after each "factory reset", such as each time a manager device takes ownership of the DSD 100.

Creating the authorization data stored in record 201 further comprises generating the metadata wrapping key 222, such as by generating a 16-bytes pseudo-random value. Access controller 102 stores the metadata wrapping key in field 222. Further, access controller 102 generates the ephemeral unlock secret 223 and encrypts the role 220 (e.g., "authorized device"), user key 221 and the new metadata wrapping key 222 with the ephemeral unlock secret 223.

Then access controller 102 generates an ephemeral public key 211 from the ephemeral unlock secret 223 and discards ephemeral unlock secret 223.

Re-Enrolment

Recall that during the registration scenario, initiated by the manager device 110, the access controller 102 creates authorization data, as illustrated in FIG. 2a. During the re-enrolment scenario, initiated by the authorized device's 111 first connect with the access controller 102 of the DSD 100, the access controller 102 alters record 201 so that the Authorized Device Metadata (ADM) 205 is encrypted by the metadata wrapping key 213/222, which is encrypted using the ephemeral unlock secret 223.

More particularly, when a pre-authorized device connects for the first time, the Authorized Device Metadata (ADM) 205 is wrapped with the pre-authorized metadata wrapping key 216 (see FIG. 2a). When the pre-authorized device connects, the access controller 102 performs the re-enrolment process. As part of the re-enrolment process, the access controller 102 uses the pre-authorized device's transport public key to complete a "logical unlock" of the data storage device. Once this is performed, the metadata wrapping key (MWK) 222 is available wrapped by the Ephemeral Unlock Secret (EUS) 223, and the access controller rewrites the record 201 using the Metadata Wrapping Key (MWK) to encrypt the authorized device metadata 205.

FIG. 2a depicts data record 201 prior to the re-enrolment of the authorized device 111. FIG. 2b depicts the state of the data record 201 after the access controller 102 has completed the re-enrolment process for authorized device 111, and the authorized device 111 is enabled to decrypt the encrypted user content data. Note that field 212a in FIG. 2a holds the transport public key, as received from the manager device 110; however, field 212b in FIG. 2b holds the unlocking public key, because prior to the re-enrolment step, the unlocking public key has not yet been generated.

Note also that, in contrast to FIG. 2b, the authorized device metadata 205 in FIG. 2a is not encrypted by the new metadata wrapping key, but by a pre-authorized metadata wrapping key 216/214, because the actual metadata wrapping key 222 is not yet available to the authorized device 111. The pre-authorized metadata wrapping key 214 may be identical to the pre-authorization key 202a at this stage or generated separately. It is noted that the pre-authorized metadata wrapping key 214, which now encrypts the authorized device metadata 205 can be generated only by the access controller 102 and not provided by the authorized device 111, because the authorized device 111 does not have access to the authorized device slot key that is used to generate the pre-authorized metadata wrapping key 214 from the transport public key 209.

The re-enrolment process is triggered by the authorized device 111 first connecting with the access controller 102, and the authorized device 111 sending its transport public key to access controller 102. Access controller 102 uses the transport public key and the stored authorized device slot key to generate the pre-authorization key 202a. Access controller 102 can then search for the pre-authorization key 202a in the configuration memory 115 to retrieve record 201. Access controller 102 can also use the pre-authorization key as the pre-authorization metadata wrapping key to decrypt the authorized device metadata 205. Re-enrolment may also be triggered by other events or periodically to ensure the unlocking public key 212b is not used for too long.

In response to receiving the transport public key 209 from the authorized device, the access controller 102 generates a challenge, using the ephemeral public key 211 and an unlock blinding key, and transmits 324 the challenge to the DSD 100. The DSD 100 responds to the challenge with a response 327. Access controller 102 then creates the ephemeral unlock secret 223 from the response. It is noted that only the authorized device 111 with the private key corresponding to transport public key 209 can create a valid response. This means that even if an attacker disassembles the configuration memory 115 and reads the authorized device slot key to generate the pre-authorization metadata wrapping key to decrypt the ephemeral public key 211, the attacker would still not be able to generate the ephemeral unlock secret 223. It is further noted that a pre-authorization for an authorized device can only be used once. Once a pre-authorization is "accepted" and the re-enroll completes, the pre-authorization key can no longer be used.

Access controller 102 validates the response by checking that the response works as ephemeral unlock secret 223 and in response, updates the authorization data in record 201. More particularly, access controller 102 checks whether field 212b for the unlocking public key is identical to the transport public key 209. In response to determining that field 212b for the unlocking public key is identical to the transport public key 209, access controller 102 requests a new unlocking public key from authorized device 111 and stores the returned key as unlocking public key 212b.

Access controller further decrypts the metadata wrapping key 222 that was generated during registration by the manager device 110. At this stage, access controller 102 may re-generate the ephemeral unlock secret 223, encrypt role 220, user key 221, and metadata wrapping key 222, re-generate and store the ephemeral public key 211 and discard the ephemeral unlock secret 223. Finally, access controller encrypts the authorized device metadata 205 with the metadata wrapping key 222 and overwrites the pre-authorization key 202a with random bits 202b to make the configuration memory 115 indistinguishable from random data even with the possession of the transport public key and/or the unlocking public key. This concludes the update of the authorization data stored in record 201 and the re-enrolment process. As a result, the authorized device 111, as one of multiple authorized devices, is now allowed to decrypt the encrypted user content data through the unlocking steps set out above.

The registration and re-enrolment processes described above, involving the creating and update of authorization data stored in record 201, enables the local registration of multiple authorized devices using only their public keys during the first step of local registration by the manager device 110. In this way, no secret information needs to be shared that could potentially be intercepted and used for malicious unlocking of other devices of the user.

Multiple Roles

Returning to FIG. 2a, configuration memory 115 stores multiple entries of which only two are shown (first entry 201 and second entry 250). In most cases, there is one entry per registered device. Each 'registered' device may be a manager device 110 or authorized device 111, 117, 118, 120, 121. There may be additional entries, such as for a recovery key (not shown).

First entry 201 is associated with authorized device 111, as explained in detail above. It is noted again, that the first entry stores a user key 221 that is encrypted by ephemeral unlock secret 223, which can be calculated from a response to a challenge using the ephemeral public key ECC-Pub (EUK) 211.

Second entry 250 is associated with manager device 110. Most fields in second entry 250 have the same functionality as in first entry 201 and as described above. In summary, a pre-authorization key 252 enables locating second entry 250 at the first connection of manager device 110 with DSD 100, noting that manager device 110 may have been registered by another manager device that initially performed the take ownership process. This local registration proceeds the same way as the registration of an authorized device explained above (including the re-enrolment and the use of certificates to provide the entry index and metadata wrapping key). Again, a copy of the metadata wrapping key 253 and the pre-authorized metadata wrapping key 264 are stored encrypted by the authorized device metadata key to enable manager access to authorized device metadata 255, which is encrypted by the metadata wrapping key 263. The metadata wrapping key 263 is provided in a certificate by the manager device 110 to decrypt the authorized device metadata 255, which comprises a device type 256 and role 257. The role 257 is now different to the role 207 as role 257 holds a value indicating a manager role, whereas role 207 holds a value indicating a user role. It is noted that the metadata wrapping key 203/213/222 of first entry 201 is different from metadata wrapping key 253/263/272 of second entry 250.

Again, similar to the first entry 201, authorized device metadata 255 comprises a name 258, transport public key 259, unlocking key metadata 260, ephemeral public key 261 and unlocking public key 262 of the manager device 110. These functions are similar to their counterparts in first entry 201 and as described above. Manager device 110 also stores a transport private key and unlocking private key on a secure hardware module. Further, access controller 102 generates a challenge based on the ephemeral public key 261 and calculates, based on the response from the manager device 110, the ephemeral unlock secret 273, which decrypts a second copy of the role 270 and a second copy of the metadata wrapping key 272. In contrast to the first entry 201, where the user key 221 is decrypted, the ephemeral unlock secret 273 now decrypts the manager key 271, which provides manager access.

In some examples, the user key 221 is directly derivable from the manager key 271, which means that the manager key is the only secret information that is required to calculate the user key. The derivation may be one-way, which means the manager key cannot be derived from the user key. The derivation may be based on a hash function, such as a hash-based message authentication code (HMAC) according to the request for comments (RFC) 5869 of the Internet Engineering Task Force (IETF) using Secure Hash Algorithm 2 (SHA-2) with 512 bits (see also National Institute of Standards and Technology special publication (SP) 800-56C). It is noted that the manager key is identical for all manager device entries and consequently, the user key is also identical for all authorized device entries.

Having a derivable user key also means that as soon as the manager key 271 is available, the user key can always be calculated. As a result, in response to manager device 110 providing the correct response to the challenge, access controller 102 can decrypt the user content data using the user key derived from the manager key 271 which was decrypted based on the response. Therefore, manager device is said to be provided with manager access, which comprises access to the user content data and access to the authorization data stored on configuration memory 115. As a result, manager device 110 can request a list of registered devices, which can be provided by the access controller 102. Consequently, manager device 110 can store the list locally on manager device 110 and display the list on a graphical user interface. The process of retrieving all entries of registered devices may be supported by a bitmap data object that comprises one bit for each possible data entry, such as 256 bits for 256 possible registered devices. Access controller 102 sets the bit to '1' in response to writing one of the multiple entries. This way, access controller 102 can determine which entries are valid and does not attempt to decrypt invalid entries.

In contrast to manager device 110, authorized device 111 has no access to manager key 271 but only access to user key 221, which does not enable decryption of other devices' metadata. Therefore, it is said that the reading of authorization data associated with other registered devices is restricted for authorized devices (without access to the manager key 271).

It is noted here that each entry 201/250 and each further entry that is not shown, comprises metadata that is encrypted by a different metadata wrapping key. Therefore, in response to providing manager access, access controller 102 determines a separate metadata wrapping key for each entry. More particularly, with the manager key 271 available, access controller 102 calculates the authorized device metadata key 254 (which is identical for all entries) and uses that key for decrypting each entry-specific metadata wrapping key 203/253, which in turn, enables access controller 102 to decrypt each authorized device metadata 255. It is also noted that manager access does not allow decryption of the user key 221 from the authorized device entries because calculating the ephemeral unlock secret 223 requires the unlock secret key that is kept in the memory of each authorized device. However, the user key 221 is derivable from the manager key 271, so there is no benefit for the manager device 110 to decrypt the user key 221 from the authorized device entry 201.

In summary, the entries 201 and 250 store either the user key 221 or the manager key 271 which enables the access controller to selectively provide user access or manager access to the multiple registered devices.

Stored Requests

While the methods disclosed above provide an efficient and robust way of registering devices and unlocking data storage device 100, there can be further improvements to the registering of new devices. In particular, in cases where the manager device 110 is not nearby and the authorization request is transmitted out of band, improvements are possible. For example, the process can be improved so that multiple remote manager devices can approve an authorization request. Any of the multiple manager devices can then either approve the request as a user device, approve the request as a manager device, deny the request or cause the data storage device 100 to be reset with loss of user data.

In order to achieve this functionality, access controller 102 stores one or more authorization requests in non-volatile storage. One aim is that any user device that is previously unknown to the access controller 102 can create an authorization request in the data storage device 100. That user device is also referred to as a "new client". For example, user device 111, now new client 111 (before registration), can connect with the data storage device 100 and create an authorization request. More particularly, new client 111 downloads an application, e.g., from an app store, to communicate with the access controller 102 to create the new request. In the following descriptions, actions described as being performed by the new client 111 and the manager device 110 are to be understood to be performed by the apps installed on the respective devices. New client 111 (through the app) can then use the stored request to generate a data package that is to be sent to manager device 110 out of band, for example, email, instant messaging, or other channels.

It should be kept in mind, however, that the new client 111 can be an attacker device with the aim of compromising data storage device 100 or with the aim of obtaining secret information from the access controller 102. That secret information even includes information about whether other devices have requested authorization. In essence, to the unregistered new client 111, it should not be discernable whether data storage device 100 has been used before, such as by registering manager or other devices, or whether data storage device 100 is brand new out of the box. Further, no secret information that is specific to the access controller 102, such as keys and other cryptographic information, should be made available to the new client 111. It is noted that new client 111 can perform the take ownership process, which invalidates all pending requests, removes all previously registered devices and deletes all user data.

New client 111 selects a "Remote Request" option (in the app) to generate the out-of-band data package to be sent to the manager device 110. Since the request is stored on the data storage device 100, the manager can approve the request in any desired way, such as being a local manager with direct access to the data storage device 100, a manager who receives the data storage device 100 to approve the request or a remote manager who only receives the request package out-of-band.

New client 111 is prompted to provide optional additional information. This information consists of an up to 255-character free form text box and the new user device's current location. This information can be seen as metadata to give the manager more context for the request, for example, a phone number to call to contact the new client 111. The current location can be transmitted by capturing the latitude and longitude values provided by the new client 111 and sent as part of the remote access request. It is noted that the metadata may include other information. For example, access controller may require an email address or employee number, even a picture of the user. In most examples, the metadata should be fixed width (padded if not present) so that each and every access request is the same size.

New client 111 can now select the "Send Email" or "Send Message" buttons to send the remote access request. The request itself can be provided as an attachment (specialized file type) that may be fixed in size and encrypted. Selecting a different sending method does not change the attachment contents or size. Changing the contents of the attachment (even one bit) will invalidate and corrupt the attachment, noting here that a cloud server could also be used to share attachments.

New client 111 can now send the out-of-band request and wait for a response. While new client 111 is waiting for a response, the local pairing QR code and short code are displayed on the new client 111 screen to facilitate a local manager approval/denial. The new client 111 can also re-generate the out-of-bound attachment if he/she wishes to re-send to other managers. Re-generating the request does not invalidate the original attachment. The two attachments would be functional at the same, but they may contain different bytes, due to the cryptographic properties of generating the attachment. New client 111 can also cancel the pending request. Canceling will invalidate any attachments that may be in-flight. "In-flight" refers to the time between sending the request to the manager device 110 and receiving the response from the manager device 110. After cancelling the request, the new client 111 can make a new request and generate new request attachments.

Assuming the new client does not cancel the request and a local manager does not service it, the flow continues as follows. At some point (hours, days, weeks) a manager device 110 responds with a new attachment (see the manager flows below for how this works). The response attachment may also be fixed length and encrypted. All responses may have the same length so that it is impossible to determine the outcome of the access request by looking at the size or contents of the attachment. A single bit change to the attachment will make it invalid.

The new client 111 double clicks/taps the attachment to open it using the app. The attachment file type can be associated with the downloaded app so that the correct app opens the attachment. Response attachments may only be valid on the client that generated the request. Opening them on a different client may report that the response is invalid. In addition, if the app on the client has been re-installed since the request was generated the response attachment may also be invalid. The new client 111 validates the integrity of the attachment before continuing and attempt to connect to the data storage device 100 that the response attachment is for.

The attachment contains enough information so that the new client 111 can determine which data storage device 100 (via the identity key) the response is for. That is, the new client 111 tries each and every identity key that it has in its database to see if it has a match. A try is an attempt to decrypt the outer AEAD wrapping using the identity key. If successful, then the new client 111 knows which data storage device 100 to send the response to. The short code is derived from the IDK so the prompt contains the short code as its more user friendly. If the data storage device 100 is not connected, the new client 111 may be prompted to plug in the drive with the matching short code, and then this step is repeated.

Once the corresponding data storage device 100 is connected, the new client 111 sends the contents of the attachment to the data storage device 100 for further validation. If the pending request that matches the attachment has already been serviced or is nonexistent an error message may be displayed on the new client 111. Otherwise, the access controller 102 services the request by granting access, denying, or performing an erase and granting access. It is noted that there may be multiple request/response attachments in-flight (generated but no response received). The first one that is clicked/tapped on will be the one that is processed. Any future responses will be invalid. That is if manager X sends an approval and manager Y sends a deny. The user could be approved or denied depending on which response is processed first (X vs Y or Y vs. X).

Regardless of the outcome the pending access request may be marked as serviced. This may be achieved by overwriting the request slot with random data. Once the pending access request has been marked as serviced, no other responses are accepted. That is, the first response attachment that is clicked/tapped on is the one and only response that will be honored by the data storage device 100.

If the new client 111 is approved (as a manager or user) it will now be given access to the drive and a drive card will be displayed in the app. If the new client 111 is approved as manager, it has manager options and settings. If new client 111 is approved as user, it should not have manager options and settings. If the new client 111 is denied, an access denied message is displayed on the app. If the new client 111 was erased and approved, the access controller 102 performs a modified take ownership operation which will do the following (with no progress to the user): All existing users and pending access requests are deleted, any contents of the data storage device 100 are cryptographically erased, self-format will be applied using the default filesystem for the platform, the new client is made to be the one and only user of the drive, there are no managers. The erase and approve option gives the new client 111 the impression that they were approved as a user but the data storage device 100 they have maliciously obtained just happened to be empty. A take ownership operation can be performed to regain manager access to the drive. A drive card will be displayed in the new client 111 app following the erase.

In summary, new clients can request authorization on a drive and at most 32 pending requests can be in-flight at a given time. In other examples, this number could be lower or higher and may depend on the amount of non-volatile memory on data storage device 100. The 33rd new request, replaces the oldest pending request, that is, there is no notion of a full request store. Existing managers can approve as a user, approve as a manager, deny all requests and managers who are remote to the drive may also erase and approve as a user. Remote managers are provided with attachments to service an access request when they have no physical access to the drive. The decision is captured via a response attachment and attachments are encrypted and the outcome of servicing a request cannot be determined by analyzing at the contents of the attachment. The first manager to service a request is the only outcome to a given request. Other managers (or the same manager making a second decision) are ignored. New clients may cancel a pending access request at any time and new clients may generate a new access request at any time. It is further noted that a factory reset, take ownership or use of the recovery key clears the list of pending access requests by way of overwriting the required keys to decrypt those requests. This invalidates any requests and response attachments in flight.

Creating an Authorization Request

The following description provides further detail on the specific flow of creating the authorization request and processing the reply from the manager device 110. Keys that have the same name as the keys mentioned above, have the same function and characteristic unless stated otherwise.

Figure 5:
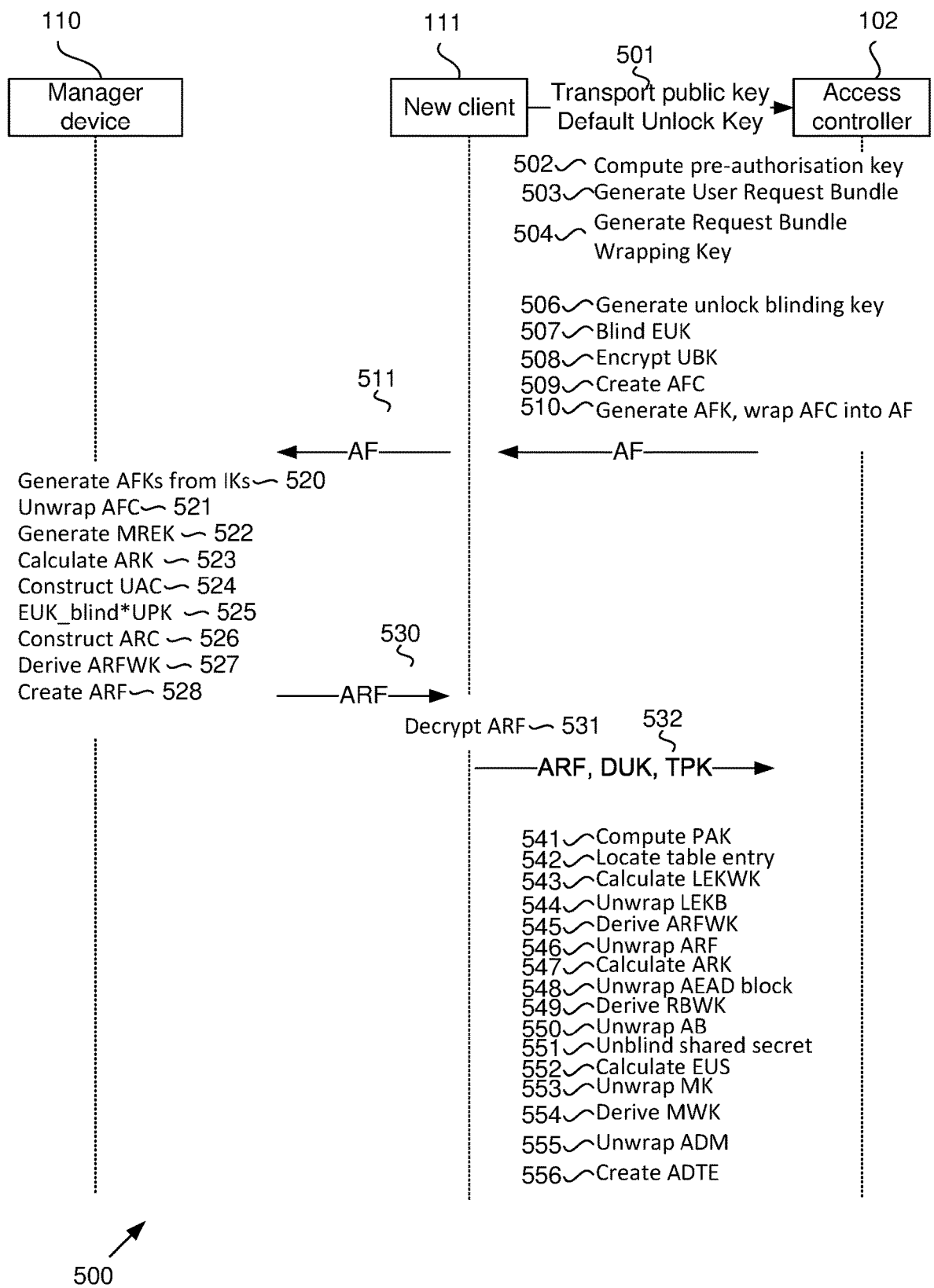
FIG. 5 illustrates a flow of steps performed by a manager device, a new client and access controller to request registration of the new client, according to an embodiment.

FIG. 5 illustrates a control flow 500 between new client 111, access controller 102 and manager device 110, according to an embodiment. As a precursor to flow 500, manager device 110 has registered as a manager, which means that manager device 110 has stored the identity key of the data storage device 102. This identity key is used later to identify for which data storage device the authorization request has been received. That is, manager device 110 may be registered as a manager on a potentially large number of data storage devices (e.g., more than 100). Therefore, when the manager device 110 receives an authorization request, it should be possible to determine which data storage device has generated that request. This is achieved through the use of the identity key stored on the manager device 110 at registration of the manager device 110. In some case, manager device 110 may be registered as a manager device for some data storage devices but as a user device for others. Therefore, manager device 110 checks whether it can service the request. Otherwise, the manager device 110 would generate a response and the access controller 102 would then determine that the authorized device certificate is not from a manager device or that the entry in the authorized device list does not list manager as the role associated with the manager device.

As a further precursor, the new client 111 has installed the app, which automatically generates the transport public key (TPK) as described above, so that it corresponds with a transport private key stored securely in the new client 111 by using elliptic curve cryptography (ECC). Similarly, the new client 111 generates a second public key referred to as default unlock key with a corresponding secret key stored in the new clients 111 secure memory. Further, the new client 111 obtains the identity key of the data storage device 100 by scanning the QR code on the device as also described above. This enables the new client 111 to connect with the data storage device 100

FIG. 5 illustrates a flow of steps performed by manager device 110, new client 111 and access controller 102. New client 111 connects to access controller 102 by sending 501 its transport public key and default unlock key. The data storage device 100 computes 502 the user's pre-authorization key using an elliptic curve Diffie-Hellman function of the device identification key and the default unlock key. As previously stated, the device identification key is a random generated ECC private scalar, generated during reset and take ownership. The pre-authorization key is derived by sending the blinded public version of the device identification key to the new client 111. New client 111 multiplies this with its private default unlock key and returns the result. Access controller 102 then multiplies the received value by the inverse of the blinding factor to retrieve the shared secret and use it as pre-authorization key, that is, as a look-up index.

The pre-authorization key can now be used to retrieve information from memory that is related to this specific device. It is noted that there is no device identifier (such as transport public key or default unlock key) stored on memory because that would enable an attacker to determine that a particular device has requested access. So instead, the device identifier (default unlock key) is hidden by computing a shared secret using the private device identification key. Access controller 102 uses the pre-authorization key to attempt to locate a user request bundle from a previously generated request (see more details below). At the first connection, there will be no user request bundle for this new client 111, which means access controller 102 generates 503 a new user request bundle and stores it on non-volatile memory. This also enables to persist the request until a response is received from a manager device, which may take days or weeks.

Since the user request bundle may contain secret information, it will be encrypted before sending it. Therefore, access controller 102 generates 504 a request bundle wrapping key that is derived from the authorized device slot key. The authorized device slot key is a 16-bytes random number and is used to encrypt data in in authorized device certificates so that only the issuing drive can recover the information. This key is re-randomized when using a recovery key, at take ownership, and factory reset in order to invalidate all existing pairings and pending authorization requests. Using this key, the access controller 102 can quickly find the slot for the associated authorized device given only its certificate. This removes the need to use the blinded ECDH exchange with the device identity key every time an authorized device connects. It is noted that the authorized device slot key remains secret to the data storage device 100. Deriving the request bundle wrapping key may involve the use of a key derivation function and is used to wrap/unwrap bytes to be sent to the device that only the drive should know.

As described above, the authorization request comprises a challenge-response method using an unlock blinding key (UBK). Therefore, access controller 102 generates 506 a new unlock blinding key (as described above), which essentially is an ephemeral private scalar and is generated randomly. Access controller 102 then blinds 507 the ephemeral unlock key (EUK) by multiplying it with the unlock blinding key: $EUK_{blind}=EUK*UBK$. As stated above, it is intended that multiple manager devices can approve the authorization request. However, in the challenge-response method described above, the key of a specific manager device was used. As a result, only that manager device is able to respond to the challenge correctly, which means it is not possible to send the request to any manager device. Therefore, in this improved process, the unlock blinding key is also sent to the manager device 110. However, the unlock blinding key is private, so the access controller 102 encrypts 508 the unlock blinding key using the request bundle wrapping key, which creates the authentication bundle. It is noted here that including the unlock blinding key supports the approval by multiple different manager devices.

Then, access controller 102 creates 509 an authorization file certificate that includes:
- the new client's transport public key
- the new client's default unlock key
- the authentication bundle (encrypted unlock blinding key)
- name of the new client
- device type of the new client
- request metadata, such as an additional message entered by the user of the new client, location information, email address, phone number, and others
- logical identity key of the data storage device 100 (randomly generated at take-ownership/reset to identify a logical identity)
- authorization response wrapping key (randomly generated at take-ownership/reset to derive an encryption key for the response)

Finally, the access controller 102 generates an authorization file key (AFK) by deriving it from the identity key. It is used to wrap the authorization file certificate to generate the authorization file. The encrypted data may also include a nonce generated by the access controller 102 so that the request appears random and cannot be reproduced with a known authorization file certificate. The nonce included with the authorization file certificate is also referred to as the drive nonce to distinguish it from other nonces used below. The access controller 102 sends 511 the authorization file to the new client 111 via the app, and the user of the new client 111 can now send the authorization file as an attachment to a manager (via email, messaging, etc.).

It is noted that any person that was in possession of the data storage device 100 and therefore has access to the identity key, can derive the authorization file key and decrypt the authorization file to obtain the authorization certificate. However, the decrypted authorization certificate provides no secret information. It provides the new client's public keys, which the new client sends to any data storage device anyway. It is particularly noted that the unlock blinding key is encrypted with a key that is only available to the data storage device 100. Stored authorization requests As mentioned above, access controller 102 stores the request data, so that access controller 102 can later retrieve the request data and generate another authorization request or to generate a new entry in the authorized device table. The aim is that the request data is accessible by the user (e.g., new client 111) who generated the request and no other users. The request data should also be accessible by any manager connected to the data storage device 100 and in response to the access controller 102 receiving an authorization response from the manager. It is noted that a further request is generated from the stored request data but is not byte-for-byte equal to the previous request. In some example implementations, all requests are the same size, and due to their cryptographic properties (as described herein) are indistinguishable from other requests.

Figure 7:
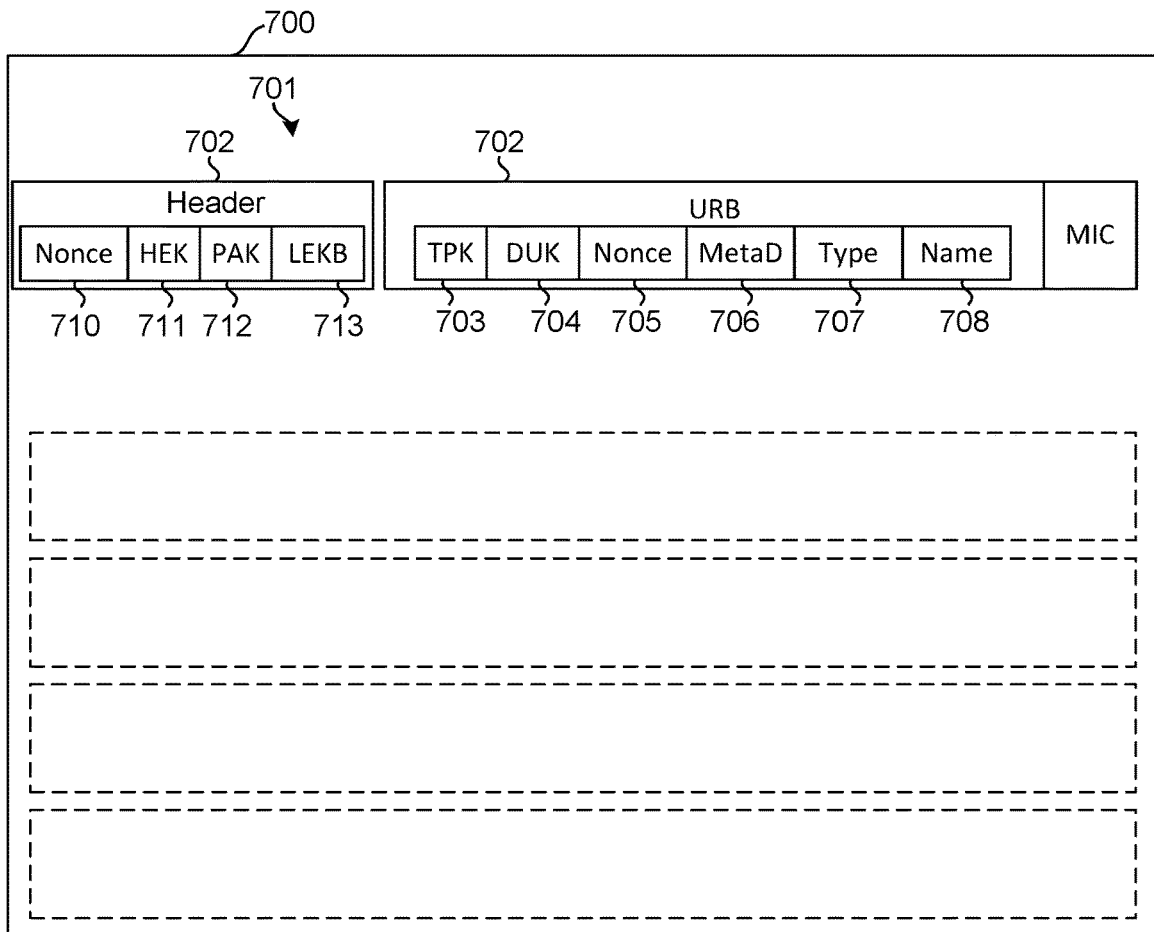
FIG. 7 illustrates a table for storing authorization requests on non-volatile memory in the data storage device, according to an embodiment.

FIG. 7 illustrates a table 700 for storing authorization requests on non-volatile memory in the data storage device 100, which is also referred to as persisting the authorization request, according to an embodiment. Table 700 comprises multiple slots, such as a first slot that stores a first request 701. There are further slots shown as dashed boxes without requests stored in them. It is noted again that table 700 is initialized with random data so that a table with stored requests is indistinguishable from an empty table. It is also noted that the table is a circular list with a pointer to the next list entry. Once the pointer overflows, such as after 32 list entries, the pointer starts back at 0 and overwrites any previous request that is stored at that position.

First request entry 701 comprises authorization data 702 including the users transport public key 703, the users public default unlock key 704, the drive nonce 705, the additional metadata 706, the device type 707 and name 708. Authorization data 702 is wrapped using the list entry key (LEK) derived from the head entry key and the public list key (LEK=HKDF(ECDH(HEK, ECC-Pub (LK)), "LEK", 16)). The flash pages assigned to pending access requests are also encrypted using a flash encryption key that is derived from the device key, which is the root of a symmetric key tree used to protect device secrets in external flash. First request entry 701 further comprises a header 709 including an authenticated encryption with associated data (AEAD) nonce 710, a public head entry key (ECC-Pub (HEK)) 711, the pre-authorization key 712 and a list entry key bundle 713.

The head entry key 711 is used to encrypt the newest entry in the list 700 and may be a random private scalar. More particularly, the user request bundle 702 (also referred to as list entry LE) is wrapped using a list entry key (LEK), for example by LE=Nonce|| AEAD-Encrypt(LEK, Nonce, list data, ECC-Pub (HEK)). The list entry key is calculated by a Diffie-Hellman process using the private head entry key and the public list key (ECC-Pub (LK)) from a publicly accessible external logical key blob in the data storage device 100, for example. That is, the private head entry key is generated, used to calculate the list entry key, and then discarded (after storing the corresponding public head entry key 711).

However, without the manager key to decrypt the private list key, it would not be possible to retrieve the list entry key. Therefore, a user would not be able to unwrap its own entry 701. Therefore, another version of the list entry key is stored in the list entry key bundle 713. This bundle, including the list entry key is wrapped using a list entry key wrapping key (LEKWK). This wrapping key is calculated by another Diffie-Hellman process using the device identity key and the users default unlock key. That is, the access controller 102 can generate the wrapping key using the public default unlock key and the private device identification key. This way, the user can unwrap the list entry key using its default unlock key while the manager can also re-generate the list entry key by using the secret list key and the stored public head entry key 711.

It is noted that the external logical key blob (ELKB) contains the authorized device slot key, the logical identity key (LIK), the logical identity certificate (LIC), the user key validation blob (UKVB), the encrypted list key and device identification key, encrypted by the manager private key wrapping key (MPKWK) (AEAD-Encrypt(MPKWK, Nonce, LK|| DIK)), the public list key (ECC-Pub (LK)), the public device identification key (ECC-Pub (DIK)), the public ephemeral unlock key (ECC-Pub (EUK)) and the authorization request wrapping key (ARWK). This key blob is generated when the data storage device 100 is erased and stored in one whole page of the flash using a flash encryption key (FEK), which is derived from the device key (DK) and is the main key used to encrypt and authenticate the contents of the external SPI flash, thus binding that SPI flash to the particular Nordic device in use, for example.

So once the manager key is available, the access controller 102 can decrypt the private list key by first decrypting the external logical key blob by using the flash encryption key and then decrypt the list key in the blob by deriving the manager private key wrapping key from the manager key and then using the result to decrypt the private list key. Together with the public head entry key 711, access controller 102 can derive the list entry key to unwrap the user request bundle 702.

Approving an Authorization Request

Manager device 111 receives the authorization file out-of-band (attached to email, instant message, etc.). The manager opens the attachment with the app, which may be the same app as installed on the new client 110. As stated above, the manager device 110 has stored the identity key of connected data storage devices. Therefore, manager device 110 derives 520 an authorization file key for each identity key stored on the manager device 110. Manager device 110 then attempts to unwrap 521 the authorization file trying each of the generated authorization file keys. If one of the keys is able to unwrap the authorization file, the manager device 110 determines that the authorization file was generated by the data storage device with the identity key from which that authorization file key was derived. This way, the manager device 110 can identify the data storage device 100 without a device identifier being included in the request. Manager device 110 further checks that it is registered as a manager and not only as a user on that data storage device 100.

Now the manager has access to the content of the authorization file certificate, including the new client's public keys, name and additional metadata. The manager can now decide whether to approve or deny the request.

The manager device 111 also generates 522 a manager response ephemeral key, which is a private key used as one half of the EC Diffie-Hellman key used to unwrap the authorization response file (see below). More particularly, manager device 111 computes 523 the authorization response key (ARK) via a Diffie-Hellman process of the public authorization response wrapping key (ECC-Pub (ARWK) in the authorization file certificate from the data storage device 100) and the freshly generated private manager response ephemeral key, and applying a key derivation function to the result, so ARK=KBKDF(ECDH(ARWK, MREK)). It is noted that the manager device 110 has received the public authorization request wrapping key from the data storage device 100 and has generated the private manager response ephemeral key. The data storage device 100 has the private authorization response wrapping key and will receive the public manager response ephemeral key to derive the shared secret, which is the authorization response key. The key derivation function that outputs the authorization response key may have a further input for further information. That further information may comprise the drive nonce that was generated by the access controller 102 and included into the authorization file at step 510. Manager device 110 may generate a further nonce and include that into the payload for encryption of the response, again to make the response appear random. The nonce generated by the manager device 110 may also serve as a further input to the key generation function. As a result, the correct key can only be generated if the shared secret can be derived from the authorization response wrapping key and the manager response ephemeral key as well as if the drive nonce and the manager device-generated nonce are available. Again, it is noted that the drive nonce is included into the authorization file (step 511) and the manager-device generated nonce is included in the authorization response file 530. As a result, both the manager device 110 and the access controller 102 can derive the correct authorization response key.

If the manager approves the user request, the manager device 110 constructs 524 a user attestation certificate including the transport public key and default unlock key of the new client 111 (as received in the request). The user attestation certificate further comprises a value indicative of how a user of new client 111 has been validated. This value may be selected from the following options:

0x00 Not Verified;
0x01 Manually Verified;
0x02 In Person Verified;
0xFF Unknown.

The user attestation certificate is signed by the manager device's transport public key to ensure it is created by a valid manager device. The manager device 110 also multiplies 525 the blinded ephemeral unlock secret by its own private unlocking public key. In the case of a deny or erase (and then approve as user of the erased drive), the user attestation certificate and blinded unlock secret are set to all zeros as they are not needed by the data storage device 100. These padding zeros are used to keep the response attachment the same size regardless of manager decision. The same size along with the file's encryption prevent both the user and an attacker from distinguishing an approval response from a denial or an erase.

Manager device 110 further constructs 526 an authorization response certificate (ARC) containing the transport public key and default unlocking key of the manager device, as well as the logical identity key previously received, the manager's response and the blinded shared secret values (EUK*UBK*TPK).

Similarly to the authorization file key explained above, the manager device 110 derives 527 the authorization response file wrapping key from the identity key of the current request.

Now, the manager device 110 uses the authorization response key to wrap the authorization response certificate, the authorized device certificate of the manager device, the user attestation certificate and adds the public manager response ephemeral key to the header to create a wrapped AEAD bundle. Finally, the manager device 110 uses the authorization response file wrapping key to wrap the AEAD bundle and adds the response version number to the header to create 528 an authorization response file, and sends 530 this file back to the new client 111. This may be the same or a different out-of-band channel than the one used to send the request.

New client 111 can now also attempt to decrypt 531 the authorization response file using potentially multiple authorization response file wrapping keys, each being derived from an identity key of a respective data storage device. Once the decryption is successful, the new client 111 has identified the correct data storage device 100 by way of identifying which key successfully decrypts the authorization response file. Again, the new client 111 can identify data storage device 100 from the authorization response file without having available an identifier in the authorization response file. New client 111 can then display the identity (such as the short code derived from the identity key, or name) of data storage device 100 to the user, so that the user can connect to the correct data storage device 100. New client 111 then sends the authorization response file to the data storage device 100. Preferable, new client 111 sends the authorization response file in wrapped form as received from the manager, but in other examples it can also be sent unencrypted.

Processing the Response

Access controller 102 receives the authorization response. Further, during connection of the new client 111 with the data storage device 100, the new client 111 provides 532 the default unlock key to the access controller 102. The access controller 102 then computes 541 the user's pre-authorization key by sending the blinded public device identification key to new client 111 and receiving the result of multiplying it with the private default unlock key using a Diffie-Hellman process. Access controller 102 then searches in table 700 to locate 542 the entry with a matching pre-authorization key 712. In the next step, access controller 102 unwraps the user request bundle 702. If the request is not found in table 700, it means that the request has already been serviced, cancelled by the new client, or has been replaced due to the nature of the circular buffer.

In order to unwrap the user request bundle 702, access controller 102 first uses the private device identification key and the users public default unlock key in a Diffie-Hellman process to calculate 543 the list entry key wrapping key. This key unwraps 544 the list entry key blob 713, which contains the list entry key. It is noted, as stated above, this step does not require a response from the manager. Instead, the user of new client 111 can connect at any time and read the list entry, such as to re-create another authorization request to a manager.

However, to register the new client 111, access controller 102 requires an appropriate response from the manager. So in response to receiving that response, access controller 102 derives 545 the authorization response file wrapping key from its identity key and unwraps 546 the authorization response file. From the decrypted user request bundle 702 the access controller 102 retrieves the nonce 705. Access controller 102 then calculates 547 the authorization response key using its private authorization response wrapping key and the public manager response ephemeral key included in the authorization response file and the nonces as described above.

With the authorization response key, access controller 102 unwraps 548 the AEAD block in the authorization response file and checks that the authorization response file certificate contains the logical identity key of the data storage device 100. Access controller 102 then validates the authorization device certificate using its authorized device slot key. If the logical identity key does not match, this means that the data storage device 100 has changed ownership, factory reset, or recovered since the request was generated. The new client 111 can then create a new request.

Then, access controller 102 derives 549 the request bundle wrapping key from the authorized device slot key, unwraps 550 the authorization bundle received in the response, to obtain the unlock blinding key. With this unlock blinding key access controller 102 can calculate the inverse of the unlock blinding key and multiplies 551 the inverse with the blinded shared secret received from the manager.

Then, access controller 102 calculates 552 the ephemeral unlock secret and obtains the correct slot of the manager device from the authorized device certificate included by the manager device 110. This means there is no pre-authorization key that needs to be calculated for the manager device. This enables the unwrapping 553 of the manager key (271 in FIG. 2a) from the managers authorized device table entry slot (250 in FIG. 2a) to derive 554 the manager wrapping key. Finally, this can unwrap 555 the authorized device metadata to confirm the responder is a valid manager.

Method of Storing Authorization Requests

Figure 6:
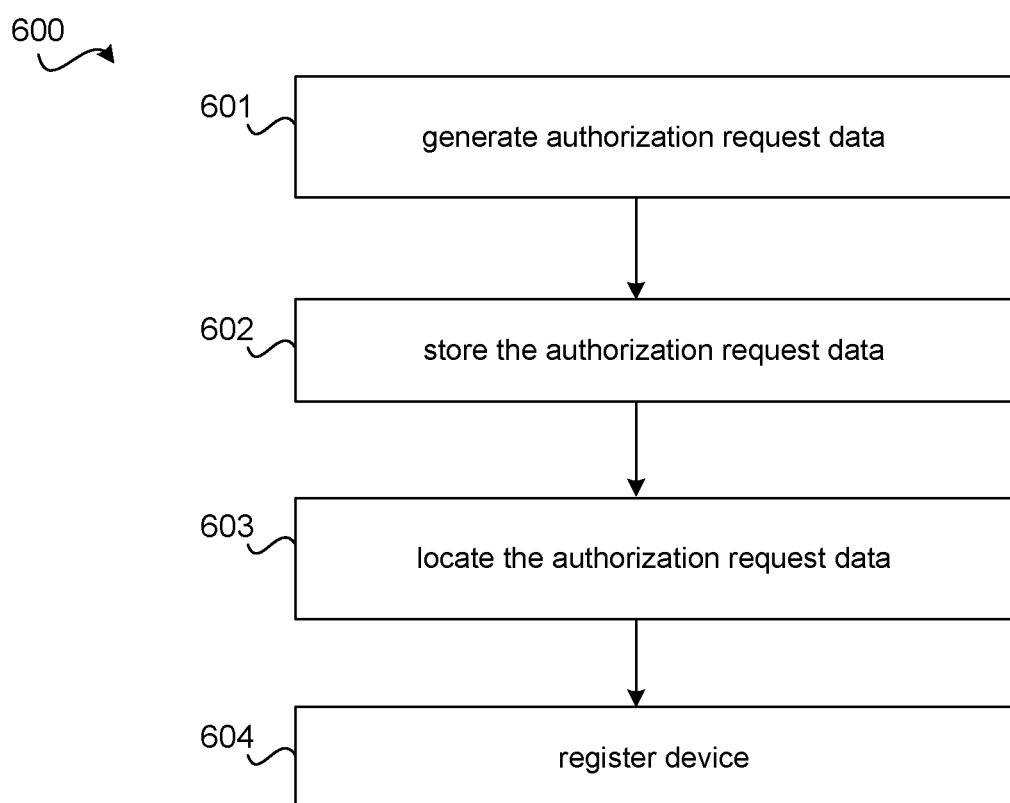
FIG. 6 illustrates a method for registering a new client with a data storage device, according to an embodiment.

FIG. 6 illustrates a method 600 as performed by access controller 102, according to an embodiment. Method 600 is a simplified version of the steps shown in FIG. 5 corresponding to access controller 102. Accordingly, access controller 102 generates 601 authorization request data indicative of multiple devices to be authorized, and stores 602 the authorization request data on non-volatile configuration memory of the data storage device as described herein with reference to FIG. 7. Upon approval of the authorization request data by a manager device 110 that is registered with the access controller 102 as a manager device (as indicated by record 250 in FIG. 2), access controller 102 locates 603 the authorization request data of one of the multiple devices to be authorized by deriving the pre-authorization key as described herein. Finally, access controller 102 registers 604 the one of the multiple devices to be authorized as an authorized device by creating a new entry in device list 200 in FIG. 2a.

It is noted here that authorized device may be a user device or a manager device. In other words, the device may be authorized to be a manager device or a regular user device. Upon a device to be authorized requesting to be registered as an authorized device, access controller 102 generates an authorization request based on the first key (Pub-(EUK)) 261 that is identical for each of the multiple authorized device records, which means the request is device-unspecific as the first key is the same for all registered manager devices. As a result, the user of new client 111 does not need to choose one manager but can send the request to any of the managers or even a group of managers with one of them approving the request. Further, the request may not specify a requested role (manager/user) for the device to be authorized. Instead, the role depends on the selection by the manager and the manager device includes the selected role into the response.

Common ECC Point for Manager Entries

As described above with reference to FIG. 2a, access controller 102 encrypts the manager key using the ephemeral unlock secret 273 as the encryption key. At encryption, access controller 102 calculates the ephemeral unlock secret 273 by generating the secret ephemeral unlock key (EUK) and multiplying it with the unlocking public key 262. In other examples, access controller 102 does not generate the secret ephemeral unlock key but instead uses a stored public ephemeral unlock key to perform a blinded Diffie-Hellman key exchange as described herein. The unlocking public key 262 may be identical to the default unlocking key at first and can be changed at a later stage when required. Once the ephemeral unlock secret is calculated, access controller 102 discards the secret ephemeral unlock key (if generated at all) and only stores the public version ECC-Pub (EUK).

As noted above, there may be multiple manager devices registered, so there may be multiple entries 250 in table 200. However, new client 111 does not know which manager will receive the authorization request. Therefore, access controller 102 uses the same public ephemeral unlock key (EUK) for all manager devices. This means that when a new manager device is registered using the public transport public key of the manager device, all manager entries are re-generated because a new ephemeral unlock key is created in order to derive the ephemeral unlock secret, which is not derivable with only the public ephemeral unlock key. In another example, the ephemeral unlock key remains the same until factory reset or take ownership and the ephemeral unlock secret for a new manager device is calculated by sending the blinded public ephemeral unlock key to the manager device for multiplication by the private transport public key as described herein. In both cases, the ephemeral unlock secret 273 is different for each manager entry 250 because it is derived from the unlocking public key 262, which corresponds to a private key stored on the manager device.

So, when the access controller 102 receives the response from the manager, the response includes the authorization response certificate, which includes the authorized device certificate of the manager device. This authorized device certificate includes the slot number of that manager device. This enables access controller 102 to retrieve the correct manager slot 250 and to calculate the correct ephemeral unlock secret (EUS). More particularly, when the access controller 102 creates the request, it includes the blinded ephemeral unlock key: ECC-Pub (EUK)*UBK. Manager device 110 multiplies this with its private unlocking public key: ECC-Pub (EUK)*UBK*UPK. Access controller then unblinds this: ECC-Pub (EUK)*UBK*UPK*UBK$^{-1}$. Due to commutativity this equals ECC-Pub (EUK)*UPK, which also equals EUK*ECC-Pub (UPK), which is the first generation of the ephemeral unlock secret EUS. This now unwraps the manager key, which is also identical for all managers.

Adding New Client

At this stage, the response is verified to have originated from a valid manager device, in the sense that the manager device 110 has a corresponding entry in table 200. Access controller 102 now uses the user attestation certificate to create 556 a new authorized device table entry in table 200. The user attestation certificate comprises the new client's 111 transport public key and default unlock key. It is signed with the manager's transport public key, which is available at 259 in FIG. 2a to verify the signature of the user attestation certificate. Access controller 102 then locates an empty entry in table 200, or appends a new entry to the last entry, and stores the pre-authorization key, role, name, transport public key and other data shown in record 201 in FIG. a2. In response to completing these steps, access controller performs re-enrolment as described above to arrive at the record 201 shown in FIG. 2b. Finally, access controller 102 deletes entry 701 in table 700 in FIG. 7.

As explained in more detail below, the decision by the manager is indicated by a corresponding byte value in the manager response. While most examples herein relate to approval, in other cases the manager has not approved the request but denied it. In that case, manager device 110 generates random bytes in place of the user authorization certificate and the blinded ephemeral unlock key shared secret. In response, access controller 102 simply deletes entry 701 from table 700 (or marks as serviced) and does not generate a new entry in table 200. The app on new client 111 may display a message that the request has been denied. In yet another scenario, the manager chooses to erase the drive (re-generate keys) and then authorize new client 111 as a user device. This may be useful in situations where the manager does not wish to disclose to the new client 111 that the device has been erased. Instead, it appears to the new client 111 that it has been added to a data storage device that was simply empty before requesting access. More particularly, access controller 102 creates an entry for a 'dummy' manager device that does not exist with randomly generated keys. Access controller 102 then adds new client 111 as the only user device.

Diffie-Hellman Processes

Figure 8:
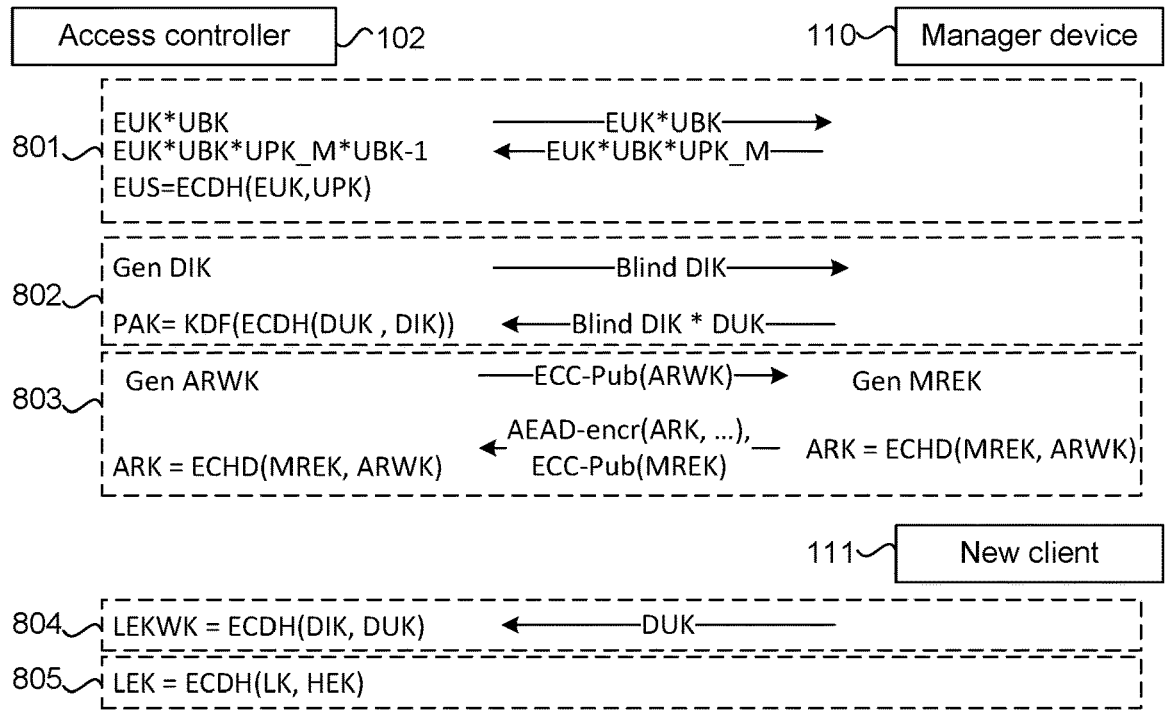
FIG. 8 summarizes multiple Diffie-Hellman processes that are performed to register a new client with a data storage device, according to an embodiment.

The description above provides a number of stages where a Diffie-Hellman process is used and FIG. 8 summarizes these as they occur between access controller 102 and manager device 110, according to an embodiment. New client 111 plays an intermediary role to forward files between the manager device 110 and the access controller 102 and is therefore omitted for clarity. The stages are shown in an arbitrary order and are not necessarily performed in the order shown in FIG. 8 but can be performed in any order.

A first Diffie-Hellman process 801 generates the ephemeral unlock secret in order to decrypt the encrypted user data as well as the manager key. This has been described above also with reference to FIG. 2a and FIG. 2b. There, it can be seen that the ephemeral unlock secret 223/273 encrypts the user key 221 and the manager key 271, respectively. In this first process, the access controller 102 first blinds the public ephemeral unlock key 211/261 by multiplying it with an unlock blinding key and sends the result to the manager device 110. It is noted that the private ephemeral unlock key has been deleted. The manager device 110 multiplies the received value with its own private unlock public key and sends back the result to the access controller 102. The access controller unblinds the result, which results in the ephemeral unlock secret to decrypt the manager/user key.

In a second Diffie-Hellman process 802, access controller 102 calculates the pre-authorization key in order to locate entries that corresponds to a particular device. This second process 802 is executed twice. In the first execution, access controller 102 calculates the pre-authorization key 712 of the new client 111 to check for authorization requests corresponding to new client 111 in the list of pending requests 700. In response to receiving a response file from the manager device 111, access controller 102 performs process 802 a second time to calculate the pre-authorization key 252 for the manager device 110 in order to locate the entry corresponding to the manager device 110 in the list of authorized devices 201 as shown in FIG. 2a. In order to calculate the pre-authorization key, access controller 102 generates a device identification key pair, sends the public key (potentially blinded) to new client 111/manager device 110. New client 111/Manager device 110 then multiplies the received value by its own private default unlock key and returns the result to the access controller. Access controller 102 potentially unblinds the result to thereby calculate the pre-authorization key for the new client 111/manager device 110. It is possible to calculate the pre-authorization key directly from the public default unlock key received from new client 111 if the private device identification key is available. Alternatively, device controller 102 can force the other device to prove that it has the corresponding private default unlock key by sending the (blinded) public device identification key and requiring the other device to multiply it with its private default unlock key. In some examples, new client 111 is directly connected to the data storage device 100 and therefore, access controller 102 uses the public default unlock key and manager device 110 is remote and therefore access controller 102 sends the blinded public device identification key and requires multiplication by the private default unlock key.

In a third Diffie-Hellman process 803, access controller 102 calculates the authorization response key. This key is different for each request/response. That is, when a new authorization request file is to be sent manager device 110, (even for an existing pending request), access controller 102 generates a new authorization response wrapping key and sends the public version of that to manager device 110. Manager device 110 generates a new manager response ephemeral key and multiplies the private version of it with the received key. Manager device 110 uses the result to encrypt the response (AEAD block above). Manager device 110 sends back the AEAD block together with the public version of the manager response ephemeral key. On receipt, access controller 102 multiplies the received public manager response ephemeral key with the private authorization response wrapping key to re-generate the authorization response key (the shared secret) and decrypts the AEAD-block.

In a fourth Diffie-Hellman process 804 is similar to process 802 in the sense that access controller 102 sends the blinded public device identification key to new client 111. New client 111 multiplies that with its private default unlock key and sends the result back to access controller 102, which in turn, unblinds it by multiplying it with the inverse blinding factor to generate the list entry key wrapping key, which is included into the list entry key bundle 713 as explained above with reference to FIG. 7.

In a fifth Diffie-Hellman process 805, the access controller uses the private head entry key and the public list key to generate the list entry key. It is noted that the public head entry key is stored at 711 in each list entry. So the list entry key can be re-generated by using the stored public head entry key and the private list key.

Local Authorization

It is noted that in some examples described above, it is assumed that manager device 110 is located remotely from data storage device 100. For example, manager device 110 is out of range of a direct wireless communication channel, such as Bluetooth. In other examples, however, manager device 110 connects directly to data storage device 100 after the request 701 has been stored.

As mentioned above, the request data 702 is encrypted using the list entry key, which, in turn derived through a Diffie-Hellman process from the head entry key and the list key. The public head entry key 711 is available from header 70. The list key is stored on data storage device 100 wrapped by the manager key. So once manager device 110 is connected and the ephemeral unlock secret is re-generated, the manager key is available as shown at 271. Therefore, access controller 102 can enwrap the private list key and then calculate the list entry key to decrypt list entry 702. Manager device 110 prompts manager to approve or deny the authorization request. In response to an approval, access controller 102 uses the data in 702 to generate a new entry in the list of authorized devices shown in FIG. 2a. In particular, access controller 102 uses the transport public key 703 from FIG. 7 and writes it into fields 209 and 212a in FIG. 2, writes name 708 to name field 208 and writes type 707 to type field 206. Finally, access controller 102 generates the ephemeral unlock key to generate the ephemeral unlock secret to encrypt the role 220, user key 221 metadata wrapping key 222. This completes registration from the manager device's 110 view. Upon reconnection, new client 111 may then perform re-enrolment as described above. Alternatively, the manager may choose to deny the request, which means access controller marks the request as serviced without creating a new entry in table 200.

Circular List

As stated above, pending authorization requests are stored in list 700 which is in addition to the list of authorized devices shown at 201 in FIG. 2*a*. The following description provides further details on the operation of list 700 of authorization requests. Upon take ownership, that is, upon the first (manager) device being authorized by access controller 102, access controller 102 randomly generates an initial entry generation pointer (IEGP) wrapped by an initial entry generation pointer wrapping key that is directly derived from the manager key. So once the manager key is available, the initial entry generation pointer can be derived. The initial entry generation pointer is the index where the take-ownership initial value should be written.

Immediately following a take-ownership, access controller sets a next entry generation pointer (NEGP) to be the initial entry generation pointer plus one. The entry generation pointer contains the index of the "head" entry. Access controller 102 also has defined a size of the list 700, that is, the maximum number of pending authorization requests referred to as SIZE below. The least significant log 2 (SIZE) bits of the next entry generation pointer are the index of where the next entry should be written out (one past the current "head" entry mod SIZE). When entries are written, the new entry is written to the next entry generation pointer and the value of next entry generation pointer is incremented as a 32-bit unsigned value.

The value of next entry generation pointer may be included as a sequence number to indicate to authorized devices how many entries are in the list. The set of list entries with valid data written to them can be computed by the manager using the initial entry generation pointer as follows: Compute the 32-bit unsigned difference between next entry generation pointer and the initial entry generation pointer. This is the number of total entries that have been written since the last take-ownership, including the list entry for the take-ownership operation itself.

If the total number of list entries written is greater than or equal to SIZE, then all list entries contain valid data. Only the most recent SIZE list entries may be read. Otherwise, the range [IEGP mod SIZE, NEGP mod SIZE) of list entries is valid. This range is computed modulo SIZE, so for example, if SIZE is 256 and the IEGP mod SIZE is 0xFF, and the NEGP mod SIZE is 0x00, then only the entry with index 0xFF is valid. If the IEGP mod SIZE is 0xFF and the NEGP mod SIZE is 0xFE, then all list entries are valid except 0xFE.

Authorization File Certificate

Figure 9:
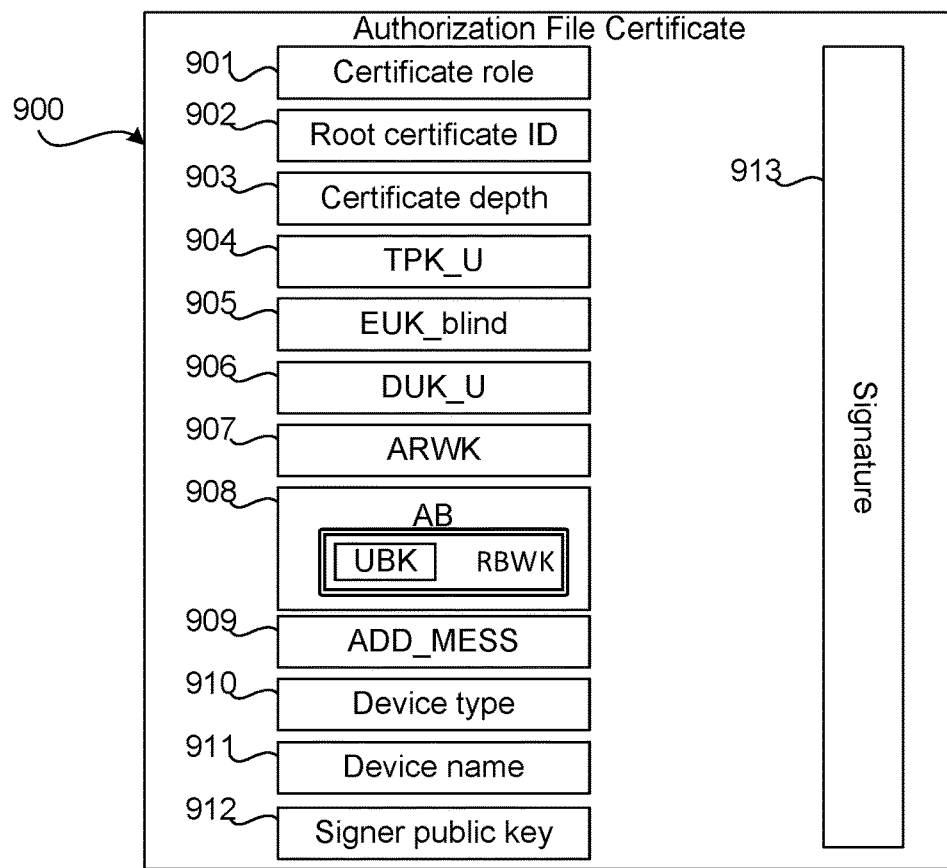
FIG. 9 illustrates an authorization file certificate.

FIG. 9 illustrates an authorization file certificate 900 as generated in step 509 in FIG. 5. As described above, access controller 102, upon being requested to register new client 111, performs steps 502-510. In particular, access controller generates an authorization request for manager device 110 and the authorization request comprises the authorization file certificate 900. Authorization file certificate 900 comprises key data that, when received by the access controller 102 in a response to the authorization request generated by the manager device 111, enables the access controller to generate configuration data based on the key data to register the device to be authorized as an authorized device.

Similar to Authorization file certificate 400 described with reference to FIG. 4, authorization file certificate 900 comprises fields for a certificate role 901, root certificate identifier 902 and certificate depth 903. Specifically, authorization file certificate 900 comprises the public transport public key 904 of new client 111 as well as the blinded public ephemeral unlock key (ECC-Pub (EUK)*UBK) as described above and usable to derive the ephemeral unlock secret from the response generated by the manager device 110. Authorization file certificate 900 further comprises the public default unlock key 906 of the new client 111 and the public authorization response wrapping key 907 and the authorization bundle 908 that includes the unlock blinding key encrypted by the response bundle wrapping key to allow unblinding of the ephemeral unlock key/secret.

Further, authorization file certificate 900 comprises the additional message 909, device type 910, device name 911 and a public key 912 of the signer, that is, of the data storage device. More particularly, the public key 912 may be the public logical identity key that has been provided to the manager device 110 in response to the manager device being registered with the data storage device as a manager device in a logical identity certificate signed by the hardware identity key. Access controller 102 further creates a signature using the private logical identity key. This way, the access controller 102 enables manager device 110 to authenticate the authorization file certificate 900 so that manager device 102 can ensure that the authorization certificate was generated by a genuine data storage device that is linked by the root certificate 902 of the manufacturer. It is noted that the root certificate is provided to the manager device 110 through separate communication channels, such as included in the installation package of the app installed on manager device 110.

As stated above, authorization file certificate 900 comprises key data, such as the public transport public key 904 of new client 111, the blinded ephemeral unlock key 905, the public default unlock key of new client 111, and the encrypted unlock blinding key in authorization bundle 908. Manager device 110 receives this key data in the certificate and sends at least some of that key data back to the access controller 102 in a response (forwarded by new client 111). The access controller 102 receives the key data in the response and this enables the access controller 102 to generate configuration data (as shown in FIG. 2*b*) based on the key data to register the new client 111 as an authorized device.

Figure 10:
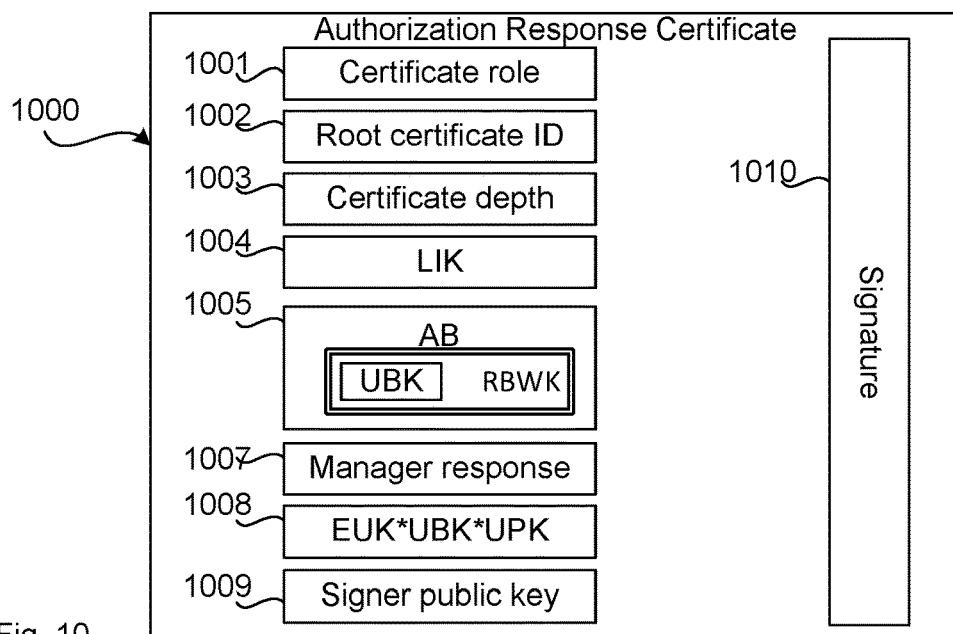
FIG. 10 illustrates an authorization response certificate.

More specifically, FIG. 10 illustrates an authorization response certificate 1000 that is created by the manager 110 as a response to the authorization request. Again, authorization response certificate 1000 comprises a certificate role 1001, root certificate 1002 and certificate depth 1003. Authorization response certificate 1000 further comprises the public logical identity key of the data storage device 100, the authorization bundle 1005 as provided at 908 in the authorization file certificate, and the manager response 1007. The manager response 1007 is one byte, for example, that indicates which option the manager has selected, akin to a command issued by the manager device. Possible values include:

0x00 Approve User as Manager
0x01 Approve User
0x02 Deny User
0x03 Wipe Drive and Approve User
0xFF Unknown.

Finally, authorization response certificate 1000 comprises the blinded ephemeral unlock key multiplied by the private unlock public key 1008 and the signer public key 1009, which is the transport public key of the manager device, that is, corresponding to the private transport public key that is stored in the manager device 110. Authorization response certificate 1000 then also comprises a signature 1010 generated by the manager device 110 using the private transport public key.

Registering the Data Storage Device

The data port 103 registers, with the host computer system 104, as a block data storage device. For example, Universal Serial Bus (USB) devices provide information in the form of a USB device descriptor. The USB device descriptor contains relevant information about the device. Accordingly, in embodiments in which the data storage device is connected to a host computer system via a USB connection, the data storage device registers with the host computer system as a block data storage device by configuring its USB device descriptor to indicate that the data storage device is a block data storage device.

The USB device descriptor provides structured information regarding the USB device such as the class of device, protocols supported, type of device, manufacturer and other configuration parameters. An operating system of a host computer can obtain the USB device descriptor of the data storage device by sending various standard control requests (e.g., GET_DESCRIPTOR requests) to the data storage device. In response to receiving these requests, the data storage device provides the USB DEVICE_DESCRIPTOR to the host computer system, thus registering the data storage device with the host computer system as a block data storage device. The host computer interprets the USB_DEVICE_DESCRIPTOR to determine the configuration and capabilities of the data storage device. The host computer system may then store information regarding the data storage device in the registers of the operating system of the host computer system.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data storage device comprising:
a data path comprising:
a data port configured to transmit data between a host computer system and the data storage device;
a non-volatile storage medium configured to store encrypted user content data; and
a cryptography engine connected between the data port and the non-volatile storage medium, wherein the cryptography engine is configured to use a cryptographic key to decrypt the encrypted user content data stored on the non-volatile storage medium in response to a request from the host computer system; and
an access controller configured to, responsive to a device to be authorized requesting to be registered as an authorized device:
generate a challenge for a manager device, wherein:
the challenge comprises:
a blinded public key of an ephemeral unlock key pair that is blinded by an unlock blinding key; and
the unlock blinding key in encrypted form;
the unlock blinding key is discarded from the data storage device after generating the challenge;
the host computer system is a first device;
the manager device is a second device; and
the device to be authorized is a third device;
provide the challenge to the device to be authorized for sending the challenge to the manager device;
receive a response to the challenge generated by the manager device, wherein the response comprises:
the blinded public key multiplied by a private key stored on the manager device; and
the unlock blinding key in encrypted form;
decrypt the unlock blinding key;
unblind, using the decrypted unlock blinding key, the blinded public key multiplied by the private key stored on the manager device to thereby calculate a shared secret; and
register, responsive to determining that the response indicates approval of registering the device to be authorized, the device to be authorized as an authorized device with the data storage device by using the shared secret to store configuration data on a non-volatile memory of the data storage device.

2. The data storage device of claim 1, wherein the access controller is further configured to generate the ephemeral unlock key pair comprising a public key corresponding to the blinded public key and an ephemeral private key.

3. The data storage device of claim 2, wherein the access controller is further configured to derive a device-specific ephemeral unlock secret from (i) the public key of the ephemeral unlock key pair and (ii) the private key stored in the manager device, to encrypt key information for unlocking the data storage device.

4. The data storage device of claim 3, wherein the access controller is further configured to discard the private key of the ephemeral unlock key pair and store the public key of the ephemeral unlock key pair on the non-volatile memory of the data storage device.

5. The data storage device of claim 1, wherein the access controller is further configured to calculate the blinded public key of the ephemeral unlock key pair by multiplying the public key of the ephemeral unlock key pair by the unlock blinding key.

6. The data storage device of claim 1, wherein the access controller is further configured to unblind the blinded public key multiplied by a private key stored on the manager device by calculating an inverse of the decrypted unlock blinding key and multiplying the blinded public key multiplied by a private key stored on the manager device with the inverse of the decrypted unlock blinding key.

7. The data storage device of claim 1, wherein the unlock blinding key included in the challenge for the manager device is protected from access by the manager device by way of encryption.

8. The data storage device of claim 7, wherein the access controller is configured to encrypt the unlock blinding key using a response bundle wrapping key that is derived from a private key accessible by the access controller and protected from access by other devices.

9. The data storage device of claim 1, wherein the access controller is further configured to store, on the non-volatile memory of the data storage device, encrypted authorization request data indicative of the device to be authorized having requested to be registered as an authorized device.

10. The data storage device of claim 9, wherein
the access controller is further configured to use the shared secret to decrypt the encrypted authorization request data; and
the configuration data stored to register the device to be authorized as an authorized device is based on the authorization request data indicative of the device to be authorized having requested to be registered as an authorized device.

11. The data storage device of claim 1, wherein:
the access controller is configured to register multiple manager devices with the data storage device as manager devices; and
a public key of the ephemeral unlock key pair and corresponding to the blinded public key is identical for each of the multiple manager devices.

12. The data storage device of claim 11, wherein the shared secret is different for each of the multiple manager devices as a result of multiplying the blinded public key of the ephemeral unlock key pair by a private key stored on that manager device of the multiple manager devices.

13. The data storage device of claim 12, wherein the access controller is further configured to register the manager device as a manager device by:
providing a manager challenge for the manager device, the manager challenge comprising the blinded public key of the ephemeral unlock key pair;
receiving a manager challenge response to the manager challenge generated by the manager device, the manager challenge response comprising the blinded public key multiplied by the private key stored on the manager device;
generating the shared secret based on the blinded public key multiplied by the private key stored on the manager device;
using the shared secret to encrypt the configuration data on the non-volatile memory to register the manager device as a manager device with the data storage device; and
discarding the shared secret.

14. The data storage device of claim 13, wherein the configuration data comprises a manager key encrypted by the shared secret.

15. The data storage device of claim 14, wherein the access controller is further configured to:
responsive to the device to be authorized requesting to be registered as an authorized device:
store, on the non-volatile memory of the data storage device, encrypted authorization request data indicative of the device to be authorized having requested to be registered as an authorized device; and
responsive to receiving the response to the challenge:
decrypt the authorization request data;
create the configuration data to include at least part of the decrypted authorization request data;
use the shared secret to decrypt the manager key; and
use the manager key to encrypt the configuration data.

16. The data storage device of claim 15, wherein the access controller is further configured to:
encrypt the authorization data using a list entry key;
encrypt the list entry key; and
store the list entry key in a header of the authorization request data.

17. The data storage device of claim 16, wherein the list entry key is encrypted using a list entry key wrapping key that is derivable using a private key stored on the device to be authorized.

18. The data storage device of claim 1, wherein the access controller is further configured to:
locate a device entry corresponding to the manager device based on identifying information that identifies the manager device in the response; and
decrypt the device entry using the shared secret to obtain key data to store the configuration data on the non-volatile memory to register the device to be authorized as an authorized device with the data storage device.

19. A method performed by an access controller of a data storage device responsive to a device to be authorized requesting to be registered as an authorized device, the method comprising:
generating a challenge for a manager device, the challenge comprising:
a blinded public key of an ephemeral unlock key pair that is blinded by an unlock blinding key; and
the unlock blinding key in encrypted form, wherein:
the unlock blinding key is discarded from the data storage device after generating the challenge;
a host computer system is a first device;
the manager device is a second device; and
the device to be authorized is a third device;
providing the challenge to the device to be authorized for sending the challenge to the manager device;
receiving a response to the challenge generated by the manager device, the response comprising:
the blinded public key multiplied by a private key stored on the manager device; and
the unlock blinding key in encrypted form;
decrypting the unlock blinding key;
unblinding, using the decrypted unlock blinding key, the blinded public key multiplied by the private key stored on the manager device to thereby calculate a shared secret; and
registering, responsive to determining that the response indicates approval of registering the device to be authorized, the device to be authorized as an authorized device with the data storage device using the shared secret to store configuration data on a non-volatile memory of the data storage device.

20. A data storage device comprising:
means for generating a challenge for a manager device, the challenge comprising:
a blinded public key of an ephemeral unlock key pair that is blinded by an unlock blinding key; and
the unlock blinding key in encrypted form, wherein:
the unlock blinding key is discarded from the data storage device after generating the challenge;
a host computer system is a first device;
the manager device is a second device; and
a device to be authorized is a third device;
means for providing the challenge to the device to be authorized for sending the challenge to the manager device;
means for receiving a response to the challenge generated by the manager device, the response comprising:
the blinded public key multiplied by a private key stored on the manager device; and
the unlock blinding key in encrypted form;
means for decrypting the unlock blinding key;
means for unblinding, using the decrypted unlock blinding key, the blinded public key multiplied by the private key stored on the manager device to thereby calculate a shared secret; and
means for registering, responsive to determining that the response indicates approval of registering the device to be authorized, the device to be authorized as an authorized device with the data storage device using the shared secret to store configuration data on a non-volatile memory of the data storage device.

* * * * *